(12) United States Patent
Alexander et al.

(10) Patent No.: US 9,112,747 B2
(45) Date of Patent: Aug. 18, 2015

(54) DYNAMIC APPLICATION INTEGRATION ASSOCIATED WITH TELEPHONIC COMMUNICATIONS THROUGH HOSTED VOIP PBX USING CLIENT-SIDE INTEGRATION PROXY

(71) Applicant: Vocalocity, Inc., Atlanta, GA (US)

(72) Inventors: Jonathan Alexander, Roswell, GA (US); Ryan Sweet, Cumming, GA (US)

(73) Assignee: VONAGE BUSINESS SOLUTIONS, INC., Atlanta, GA (US)

( * ) Notice: Subject to any disclaimer, the term of this patent is extended or adjusted under 35 U.S.C. 154(b) by 331 days.

(21) Appl. No.: 13/831,536

(22) Filed: Mar. 14, 2013

(65) Prior Publication Data

US 2013/0308630 A1  Nov. 21, 2013

Related U.S. Application Data

(63) Continuation-in-part of application No. 13/680,383, filed on Nov. 19, 2012.

(60) Provisional application No. 61/567,625, filed on Dec. 6, 2011.

(51) Int. Cl.
| | | |
|---|---|---|
| H04M 7/00 | (2006.01) | |
| H04W 84/16 | (2009.01) | |
| H04M 3/42 | (2006.01) | |
| H04L 29/06 | (2006.01) | |

(52) U.S. Cl.
CPC ...... *H04L 29/06387* (2013.01); *H04L 65/1053* (2013.01); *H04L 65/1069* (2013.01); *H04M 7/0021* (2013.01)

(58) Field of Classification Search
CPC ............................ H04L 65/1053; H04L 65/105
USPC ............................................ 370/352; 709/202
See application file for complete search history.

(56) References Cited

U.S. PATENT DOCUMENTS

| | | | |
|---|---|---|---|
| 2002/0083166 A1 | 6/2002 | Dugan et al. | |
| 2006/0165223 A1* | 7/2006 | Dugan et al. | 379/15.02 |
| 2008/0181379 A1* | 7/2008 | Chow et al. | 379/142.05 |
| 2009/0252159 A1 | 10/2009 | Lawson et al. | |
| 2010/0146125 A1 | 6/2010 | Su | |
| 2011/0271289 A1* | 11/2011 | Weiser et al. | 719/317 |

FOREIGN PATENT DOCUMENTS

| | | |
|---|---|---|
| WO | 2010/037064 A1 | 4/2010 |
| WO | 2010/040010 A1 | 4/2010 |

OTHER PUBLICATIONS

International Search Report and Written Opinion mailed Jul. 29, 2014 for Application PCT/US2014/023151.

* cited by examiner

*Primary Examiner* — Asad Nawaz
*Assistant Examiner* — Jason Harley
(74) *Attorney, Agent, or Firm* — Alexander Legal LLC; Joseph Pagnotta

(57) ABSTRACT

A system for collecting information associated with a telephonic communication made through it VoIP system by dynamically integrating a plurality of end user software applications including a client side integration proxy in electronic communication with a hosted VoIP PBX. Software executing on the client side integration proxy retrieves data related to a requested previous telephonic communication from a data store, assigns a portion of a memory cache for storing the retrieved data about the previous telephonic communication, enables one or more of the plurality of end user software applications to access the data about the previous telephonic communication, enables one or more of the plurality of end user software applications to update, modify, or add to the data about the previous telephonic communication, and retrieves and presents the supplemented data about the previous telephonic communication to the end user.

18 Claims, 6 Drawing Sheets

Example: JavaScript Interface to Proxy

- Method that integrated applications can call to initiate a new phone call:
  - makeCall(phoneNumberString) – initiate a new phone call using extension of user authenticated to the proxy
- Event handlers that integrated applications can implement to be notified and retrieve call status information from Hosted VoIP PBX through proxy:
  - onCallRinging(callDetails) – called when a new call is ringing on the extension of user authenticated to the proxy, details in array
  - onCallConnected(callDetails) – called when a new call is connected (answered)
  - onCallCompleted(callDetails) – call when a call is disconnected (completed)
- Method that integrated applications can call to provide additional data or attributes about the caller or the call:
  - provideCallerAttributes(callerAttributes) – provide array of attributes that the proxy will store for the associated phone call
- Event handler that integrated applications can implement to be notified and retrieve call attributes shared by other integrated applications:
  - onCallerAttributesChanged(callerAttributes) – called when new attributes are set or changed, full set of attributes available for the associated call passed in array

DYNAMIC APPLICATION INTEGRATION ASSOCIATED WITH TELEPHONIC COMMUNICATIONS THROUGH HOSTED VOIP PBX USING CLIENT-SIDE INTEGRATION PROXY

CROSS REFERENCE TO RELATED APPLICATION

This application is a continuation-in-part of U.S. patent application Ser. No. 13/680,382, entitled "Dynamic Application Integration Associated with Telephonic Communications Through Hosted VoIP PBX Using Client-Side Integration Proxy," filed Nov. 19, 2012, which claims the benefit under 35 U.S.C. §119(e) of U.S. Provisional Patent Application No. 61/567,625, entitled "Synchronized Integration With Hosted VoIP PBX Using Proxy," filed Dec. 6, 2011, both of which are incorporated herein by reference in their entirety.

FIELD OF THE PRESENT TECHNOLOGY

The present technology relates generally to software systems and software applications running on computing devices and, more particularly, to systems and methods for enhancing a telephonic communication or call managed, at least on one end of the connection, by a Voice Over Internet Protocol (VoIP) Private Branch Exchange (PBX) telephone system having a client-side integration proxy that enables a highly-scalable number of client-side software applications accessible to an end user on the VoIP PBX side of the telephonic communication to perform activities based on events, information, and data shared dynamically with each other and with the end user.

BACKGROUND OF THE PRESENT TECHNOLOGY

Private Branch Exchange (PBX) telephone systems provide telecommunications control to businesses. A variety of mechanisms have been created to allow software applications to interact with a PBX system. Some of these are proprietary and un-published, controlled by vendors for specific PBX implementations. Other PBX integration systems are public, providing openly-documented interfaces and communication protocols.

Over the last few decades, PBX systems have evolved from predominately proprietary hardware computing devices controlled by proprietary software to the point, where now, many PBX systems are software implementations capable of running on commodity computing devices (e.g., computer servers). For example, there are many popular open-source PBX software systems, such as Asterisk® and FreeSwitch®, and many other software PBX systems from commercial vendors, such as Microsoft Corporation.

Historically, PBX software systems use an Application Programming Interface (API) to enable properly-configured software applications to access data from the PBX and to integrate with the PBX and, in some cases, perform actions through the PBX, such as placing a call or changing system, user, and extension settings. Like the PBX systems themselves, some of these APIs are proprietary and are, therefore, controlled and used only by the parties in control of the PBX and APIs. The APIs for Asterisk®, FreeSwitch®, and for hosted PBX systems, such as those provided by Twilio®, are all examples of APIs that are public and therefore can be used by any compliant software application. Multiple software applications can be integrated with a PBX through its API, but each application typically integrates directly with the PBX and, for this reason, many software applications running simultaneously for one or more PBX end users, whether the end user is the initiator or recipient of the call or communication being handled by the PBX, potentially create a serious overload problem on the API of the PBX or on the PBX itself. Such a "direct integration" system 100 is illustrated in FIG. 1, described in greater detail hereinafter.

One solution to attempt to minimize overload problems on the PBX has been the creation of a "middleware" software application to integrate with the PBX through its API, and then to integrate indirectly to other business software applications available to the end user. For example, a number of middleware software applications have been developed that communicate directly with the PBX through its API and then "screen pop" other software applications on a computer display or user interface of the end user—for example, by opening up a window to a third party contact in an address book application when a new phone call with the third party is initiated or received by the PBX end user. However, with this type of middleware solution, the indirect integration is very limited—typically allowing only a limited communication of information or data provided by the PBX, such as a phone number and caller ID, through the middleware to the business software applications. In conventional manner, each business application that is open and displayed to the end user is also able to receive data input directly by the end user into the user interface (or window) associated with each respective software application. Although data or information from these applications can then be provided or displayed back to the end user, there is typically no way for these software applications to share events, event notifications, information, or other data with each other unless such applications are already integrated or connected directly with each other, which is often the case for software applications or modules provided by a single vendor (e.g., Outlook® Calendar, eMail, and Address Book modules, which are integrated in Microsoft Office® suite). Such middleware solutions, however, typically do not have the capability of enabling the plurality of software applications in communication with the middleware (that are typically provided by a plurality of different software vendors and that are not already integrated or part of a common software suite, such as Microsoft Outlook®) to share data dynamically in a multi-directional or multi-occurrence manner with each other and/or with the VoIP PBX end user. A conventional "indirect integration" system 200 is illustrated in FIG. 2, described in greater detail hereinafter.

With the growth of the Internet and public IP networks since the mid-to-late 1990s, a new category of hosted communications, specifically VoIP communications, have become increasingly popular. In addition, with the increase in VoIP communications and increasing use of cloud computing, there has also evolved a number of hosted, VoIP PBX systems. Like other Internet-based or cloud-based business services, a hosted VoIP PBX system allows end users to connect and use PBX services over IP networks from Internet-connected devices, such as VoIP phones, IP phones, SIP phones, desktop computers, and the like. Some of these hosted VoIP PBX services are simply managed and hosted offerings of software-based PBX systems, for example, using open source Asterisk® or FreeSwitch® PBX systems running in a managed data center. Other hosted VoIP PBX systems are proprietary or custom-developed for hosted and managed server environments. Many of these systems provide an API that allows properly-configured software applications to receive or read data from the PBX or perform specific functions through the PBX. Some of these hosted VoIP PBX systems also provide an API or a method for events that occur through the hosted VoIP PBX, such as the initiation or connection of a new phone call, to trigger individual events in other software applications, such as a screen pop of related caller information, the logging of information about a call into other software applications, or the passing of data or information related to the phone call at the time the event is triggered.

What has been missing in the industry, however, is a comprehensive and unified system that enables a plurality of client-side software applications accessible to an end user on the VoIP PBX side of a telephonic communication to integrate with a hosted VoIP PBX system, to receive granular event notifications, information, and data from the hosted VoIP PBX, to allow for real-time human input (by the end user) of data or other information pertinent to a specific call or interaction with a third party, and simultaneously to share relevant events, information, and data among and between each other and with the VoIP PBX end user, all in a way that is highly efficient and scalable.

Such a system offers significant benefits to VoIP PBX end users. For example, such a system enables the end user to have many business software applications simultaneously integrated with their hosted VoIP PBX system, and to communicate and share events, notifications, application information, and data related to phone calls, pieces of which may be stored in, managed from, or accessible by separate (typically, business-related) software applications. In addition, such a system enables a VoIP PBX end user to input new information or to modify existing information in one or more such software applications about the third party on the other end of (or otherwise relevant to) the phone call, such as information that the end user obtains about the third party during the call, that can then be input into the system by the end user and then shared dynamically and automatically with one or more or all of the various integrated software applications and which then provides such integrated applications with the ability to generate or obtain even further information about the third party or the phone call with the third party, share such information with the other applications, and to share such information with the end user. Such a system provides the most relevant and accurate data, from otherwise non-integrated software applications, to an end user on the VoIP PBX end of the call, and helps to make sure the data maintained by or otherwise accessible to the multiple business applications is as complete, up-to-date, and consistent as possible across the plurality of software applications and available to the VoIP PBX end user.

The technology and improvements described herein provide exemplary and comprehensive methods, hardware and software systems, applications, and novel techniques for allowing multiple software applications to integrate with a hosted VoIP PBX and to synchronize data with each other and with the VoIP PBX end user in a highly scalable and efficient manner that, to date, has not heretofore been available and affordable, in a non-proprietary system.

The present technologies, as described and shown in greater detail hereinafter, address and teach one or more of the above-referenced capabilities, needs, and features that are useful for a variety of businesses and industries as described, taught, and suggested herein in greater detail.

SUMMARY OF THE PRESENT TECHNOLOGY

The present technology relates generally to software systems and software applications running on computing devices and, more particularly, to systems and methods for enhancing a telephonic communication or call managed, at least on one end of the connection, by a Voice Over Internet Protocol (VoIP) Private Branch Exchange (PBX) telephone system having a client-side integration proxy that enables a highly-scalable number of client-side software applications accessible to an end user on the VoIP PBX side of the telephonic communication to perform activities based on events, information, and data shared dynamically with each other and with the end user.

A first aspect of the technology disclosed herein includes a system for dynamically integrating a plurality of end user software applications as part of a telephonic communication between an end user and a third party, the end user having a VoIP-enabled client device in electronic communication with a hosted VoIP private branch exchange (PBX) for handling and managing the end user's side of the telephonic communication, comprising a client side integration proxy in electronic communication with the hosted VoIP PBX through an application programming interface (API) of the hosted VoIP PBX, the client side integration proxy having: (i) its own API for communicating and exchanging data with the plurality of end user software applications; and (ii) memory cache dedicated to storing information about telephonic communications associated with the end user that are handled and managed by the hosted VoIP PBX, wherein, as part of the telephonic communication, the client side integration proxy: (a) assigns a portion of the memory cache for storing information specifically about the telephonic communication, (b) enables one or more of the plurality of end user software applications to access the information about the telephonic communication currently stored in the assigned portion of the memory cache, (c) enables one or more of the plurality of end user software applications, in response to information about the telephonic communication accessed from the assigned portion of the memory cache, to update, modify, or add to the information about the telephonic communication currently stored in the assigned portion of the memory cache based on data relevant to the telephonic communication obtainable or generated by the one or more of the plurality of end user software applications, and (d) periodically repeats one or more of steps (b) and (c) in order dynamically to improve the amount and accuracy of the information about the telephonic communication stored in the assigned portion of the memory cache.

In a feature, the client side integration proxy detects initiation of the telephonic communication based on data obtained from the hosted VoIP PBX through the API of the hosted VoIP PBX. In another feature, the information about the telephonic communication initially stored in the assigned portion of the memory cache includes the data obtained from the hosted VoIP PBX.

In yet a further feature, information about the telephonic communication includes one or more of the following: a phone number of the third party, a name of the third party, an IP address of the device being used by the third party for the telephonic communication, a phone number or extension of the end user, a name of the end user, an IP address of the client device of the end user, an indication whether a portion or all of the telephonic communication is encrypted, an indication whether a portion or all of the telephonic communication is using a secured communication line, an indication whether the telephonic communication is inbound to or outbound from the hosted VoIP PBX, an indication whether the telephonic communication is being monitored, an indication whether the telephonic communication is being recorded, an indication of call ringing, an indication of call answered, and an indication of call disconnected.

In yet another feature, the information about the telephonic communication stored in the assigned portion of the memory cache includes data associated with the end user and data associated with the third party.

In a feature, the client side integration proxy communicates with the hosted VoIP PBX through one active connection of the API of the hosted VoIP PBX during the telephonic communication.

In another feature, the workload imposed on the hosted VoIP PBX or the API of the hosted VoIP PBX, both during and after the telephonic communication, is unaffected by the number of end user software applications interacting with the client side integration proxy or by the amount of data retrieved from or updated, modified, or added to the assigned portion of the memory cache.

In yet another feature, the client side integration proxy notifies one or more of the plurality of end user software applications about the telephonic communication and requests the one or more of the plurality of end user software applications to update, modify, or add to the information about the telephonic communication stored in the assigned portion of the memory cache based on data obtainable or generated by the one or more of the plurality of end user software applications.

In yet a further feature, when the information about the telephonic communication stored in the assigned portion of the memory cache is updated, modified, or added to, the client side integration proxy notifies one or more of the plurality of end user software applications about the modified information and requests the one or more of the plurality of end user software applications further to update, modify, or add to the information about the telephonic communication stored in the assigned portion of the memory cache in response to the modified information.

In a feature, the client side integration proxy periodically repeats one or more of steps (b) and (c) whenever the information about the telephonic communication stored in the assigned portion of the memory cache has been updated, modified, or added to or whenever there has been a change in status (e.g., call ringing, call answered, another party conferenced into the call, call forwarded, call disconnected, and the like) of the telephonic communication.

In yet a further feature, the client side integration proxy enables one or more of the plurality of end user software applications to access the information about the telephonic communication stored in the assigned portion of the memory cache (i) by pushing at least a portion of the stored information to one or more of the plurality of end user software applications or (ii) by polling and pulling at least a portion of the stored information from the assigned portion of the memory cache.

In another feature, a respective one or more of the plurality of end user software applications further updates, modifies, or adds to the information about the telephonic communication stored in the assigned portion of the memory cache after the information about the telephonic communication stored in the assigned portion of the memory cache has been previously modified. In various embodiments, the information about the telephonic communication stored in the assigned portion of the memory cache has been previously modified by another respective one or more of the plurality of end user software applications or by the end user.

Preferably, the information about the telephonic communication includes one or more of the following provided by the end user or provided by one or more of the plurality of end user software applications: a physical address of the third party, an email address of the third party, a name of the company with which the third party works, a job title of the third party, a communication history between the end user and the third party, a communication history between the company with which the end user works and the third party, a communication history between the company with which the third party works and the end user, notes regarding the third party, links to databases having additional information about the third party or about the company with which the third party works, biographical information about the third party, current geographical location of the third party or of the company with which the third party works, a graphical representation or image of the third party, documents available to the end user and related to the third party or related to the company with which the third party works, and emails available to the end user and related to the third party or related to the company with which the third party works.

In yet a further feature, the client side integration proxy generates an interactive user interface to enable the end user to access and update, modify, or add to information about the telephonic communication stored in the assigned portion of the memory cache. In one embodiment, the interactive user interface is displayed on the end user's computing device. Preferably, the interactive user interface (i) runs in a software application installed on the end user's computing device or (ii) is an Internet-based application accessed by the end user's computing device. In another embodiment, the interactive user interface is displayed on the end user's VoIP-enabled client device. Preferably, the interactive user interface (i) runs in a software application on the end user's VoIP-enabled client device or (ii) is an Internet-based application accessed by the end user's VoIP-enabled client device.

In a further embodiment, the client side integration proxy enables the end user to access and update, modify, or add to information about the telephonic communication stored in the assigned portion of the memory cache before, during, or after the telephonic communication.

In another feature, the client side integration proxy periodically obtains additional data about the telephonic communication from the hosted VoIP PBX through the API of the hosted VoIP PBX. Preferably, the information about the telephonic communication stored in the assigned portion of the memory cache is updated to include the additional data about the telephonic communication obtained from the hosted VoIP PBX.

In one embodiment, the end user's computing device comprises the end user's VoIP-enabled client device. In some embodiments, the end user initiates the telephonic communication with the third party. In other embodiments, the third party initiates the telephonic communication with the end user.

A second aspect of the technology disclosed herein is directed to a system for enabling a plurality of software applications of an end user dynamically to update, modify, and add information to a record associated with a telephonic communication between the end user and a third party, the end user having a VoIP-enabled client device in electronic communication with a hosted VoIP private branch exchange (PBX) for handling and managing the end user's side of the telephonic communication, comprising a client side integration proxy in electronic communication with the hosted VoIP PBX through an application programming interface (API) of the hosted VoIP PBX, the client side integration proxy having (i) its own API for communicating and exchanging data with the plurality of end user software applications, and (ii) memory cache dedicated to storing information about telephonic communications associated with the end user that are handled and managed by the hosted VoIP PBX, wherein, as part of the telephonic communication between the end user and the third party, the client side integration proxy: (a) detects initiation of the telephonic communication based on data provided by the hosted VoIP PBX; (b) assigns a portion of the memory cache as the record for storing information specifically about the telephonic communication, wherein the information about the telephonic communication initially stored in the record includes the data provided by the hosted VoIP PBX, (c) enables one or more of the plurality of end user software applications to access the record, (d) enables one or more of the plurality of end user software applications, in response to information about the telephonic communication accessed from the record or in response to an event notification, to update, modify, or add to the information about the telephonic communication stored in the record based on data relevant to the telephonic communication obtainable or generated by the one or more of the plurality of end user software applications, (e) periodically repeats one or more of steps (c) and (d) in order dynamically to improve the amount and accuracy of the information about the telephonic communication stored in the record.

In a feature, information about the telephonic communication includes one or more of the following: a phone number of the third party, a name of the third party, an IP address of the device being used by the third party for the telephonic communication, a phone number or extension of the end user, a name of the end user, an IP address of the client device of the end user, an indication whether a portion or all of the telephonic communication is encrypted, an indication whether a portion or all of the telephonic communication is using a secured communication line, an indication whether the telephonic communication is inbound to or outbound from the hosted VoIP PBX, an indication whether the telephonic communication is being monitored, an indication whether the telephonic communication is being recorded, an indication of call ringing, an indication of call answered, and an indication of call disconnected.

In yet another feature, the information about the telephonic communication stored in the record includes data associated with the end user and data associated with the third party.

In a further feature, the client side integration proxy communicates with the hosted VoIP PBX through one active connection of the API of the hosted VoIP PBX during the telephonic communication.

In another feature, the workload imposed on the hosted VoIP PBX or the API of the hosted VoIP PBX, both during and after the telephonic communication, is unaffected by the number of end user software applications interacting with the client side integration proxy or by the amount of data retrieved from or updated, modified, or added to the assigned portion of the memory cache.

In yet another feature, the client side integration proxy notifies one or more of the plurality of end user software applications about the telephonic communication and requests the one or more of the plurality of end user software applications to update, modify, or add to the information about the telephonic communication stored in the record based on data obtainable or generated by the one or more of the plurality of end user software applications.

In yet a further feature, when the information about the telephonic communication stored in the record is updated, modified, or added to, the client side integration proxy notifies one or more of the plurality of end user software applications about the modified information and requests the one or more of the plurality of end user software applications further to update, modify, or add to the information about the telephonic communication stored in the assigned portion of the memory cache in response to the modified information.

In a feature, the client side integration proxy periodically repeats one or more of steps (c) and (d) whenever the information about the telephonic communication stored in the record has been updated, modified, or added to or whenever there has been a change in status (e.g., call ringing, call answered, another party conferenced into the call, call forwarded, call disconnected, and the like) of the telephonic communication.

In yet a further feature, the client side integration proxy enables one or more of the plurality of end user software applications to access the information about the telephonic communication stored in the record (i) by pushing at least a portion of the stored information to one or more of the plurality of end user software applications or (ii) by polling and pulling at least a portion of the stored information from the record.

In another feature, a respective one or more of the plurality of end user software applications further updates, modifies, or adds to the information about the telephonic communication stored in the record after the information about the telephonic communication stored in the assigned portion of the memory cache has been previously modified. In various embodiments, the information about the telephonic communication stored in the record has been previously modified by another respective one or more of the plurality of end user software applications or by the end user.

Preferably, the information about the telephonic communication includes one or more of the following: a physical address of the third party, an email address of the third party, a name of the company with which the third party works, a job title of the third party, a communication history between the end user and the third party, a communication history between the company with which the end user works and the third party, a communication history between the company with which the third party works and the end user, notes regarding the third party, links to databases having additional information about the third party or about the company with which the third party works, biographical information about the third party, current geographical location of the third party or of the company with which the third party works, a graphical representation or image of the third party, documents available to the end user and related to the third party or related to the company with which the third party works, and emails available to the end user and related to the third party or related to the company with which the third party works. Preferably, such information is provided by the end user or provided by one or more of the plurality of end user software applications.

In yet a further feature, the client side integration proxy generates an interactive user interface to enable the end user to access and update, modify, or add to information about the telephonic communication stored in the record. In one embodiment, the interactive user interface is displayed on the end user's computing device. Preferably, the interactive user interface (i) runs in a software application installed on the end user's computing device or (ii) is an Internet-based application accessed by the end user's computing device. In another embodiment, the interactive user interface is displayed on the end user's VoIP-enabled client device. Preferably, the interactive user interface (i) runs in a software application on the end user's VoIP-enabled client device or (ii) is an Internet-based application accessed by the end user's VoIP-enabled client device.

In a further embodiment, the client side integration proxy enables the end user to access and update, modify, or add to information about the telephonic communication stored in the record before, during, or after the telephonic communication.

In another feature, the client side integration proxy periodically obtains additional data about the telephonic communication from the hosted VoIP PBX through the API of the hosted VoIP PBX. Preferably, the information about the telephonic communication stored in the record is updated to include the additional data about the telephonic communication obtained from the hosted VoIP PBX.

In one embodiment, the end user's computing device comprises the end user's VoIP-enabled client device. In some embodiments, the end user initiates the telephonic communication with the third party. In other embodiments, the third party initiates the telephonic communication with the end user.

A third aspect of the technology disclosed herein is directed to a system for enabling an end user and a plurality of end user software applications dynamically to update, modify, and add information to a record associated with a telephonic communication between the end user and a third party, the end user having a VoIP-enabled client device in electronic communication with a hosted VoIP private branch exchange (PBX) for handling and managing the end user's side of the telephonic communication, comprising a client side integration proxy in electronic communication with the hosted VoIP PBX through an application programming interface (API) of the hosted VoIP PBX, the client side integration proxy having: (i) its own API for communicating and exchanging data with the plurality of end user software applications and with the end user, and (ii) memory cache dedicated to storing information about telephonic communications associated with the end user that are handled and managed by the hosted VoIP PBX, wherein, as part of the telephonic communication, the client side integration proxy: (a) detects initiation of the telephonic communication based on data obtained from the hosted VoIP PBX through the API of the hosted VoIP PBX; (b) assigns a portion of the memory cache as the record for storing information specifically about the telephonic communication wherein the information about the telephonic communication initially stored in the record includes the data obtained from the hosted VoIP PBX, (c) enables the end user and the one or more of the plurality of end user software applications to access the record, (d) enables the end user and the one or more of the plurality of end user software applications, in response to information about the telephonic communication accessed from the record in response to an event notification, or in response to new information obtained by the end user, to update, modify, or add to the information about the telephonic communication stored in the record based on data relevant to the telephonic communication provided by the end user, obtainable or generated by the one or more of the plurality of end user software applications, or provided by the hosted VoIP PBX, (e) periodically repeats one or more of steps (c) and (d) in order dynamically to improve the amount and accuracy of the information about the telephonic communication stored in the record.

In a feature, information about the telephonic communication includes one or more of the following: a phone number of the third party, a name of the third party, an IP address of the device being used by the third party for the telephonic communication, a phone number or extension of the end user, a name of the end user, an IP address of the client device of the end user, an indication whether a portion or all of the telephonic communication is encrypted, an indication whether a portion or all of the telephonic communication is using a secured communication line, an indication whether the telephonic communication is inbound to or outbound from the hosted VoIP PBX, an indication whether the telephonic communication is being monitored, an indication whether the telephonic communication is being recorded, an indication of call ringing, an indication of call answered, and an indication of call disconnected.

In yet another feature, the information about the telephonic communication stored in the record includes data associated with the end user and data associated with the third party.

In a further feature, the client side integration proxy communicates with the hosted VoIP PBX through one active connection of the API of the hosted VoIP PBX during the telephonic communication.

In another feature, the workload imposed on the hosted VoIP PBX or the API of the hosted VoIP PBX, both during and after the telephonic communication, is unaffected by the number of end user software applications interacting with the client side integration proxy or by the amount of data retrieved from or updated, modified, or added to the assigned portion of the memory cache.

In yet another feature, the client side integration proxy notifies one or more of the plurality of end user software applications about the telephonic communication and requests the one or more of the plurality of end user software applications to update, modify, or add to the information about the telephonic communication stored in the record based on data obtainable or generated by the one or more of the plurality of end user software applications.

In yet a further feature, when the information about the telephonic communication stored in the record is updated, modified, or added to, the client side integration proxy notifies one or more of the plurality of end user software applications about the modified information and requests the one or more of the plurality of end user software applications further to update, modify, or add to the information about the telephonic communication stored in the assigned portion of the memory cache in response to the modified information.

In a feature, the client side integration proxy periodically repeats one or more of steps (c) and (d) whenever the information about the telephonic communication stored in the record has been updated, modified, or added to or whenever there has been a change in status (e.g., call ringing, call answered, another party conferenced into the call, call forwarded, call disconnected, and the like) of the telephonic communication.

In yet a further feature, the client side integration proxy enables one or more of the plurality of end user software applications to access the information about the telephonic communication stored in the record (i) by pushing at least a portion of the stored information to one or more of the plurality of end user software applications or (ii) by polling and pulling at least a portion of the stored information from the record.

In another feature, a respective one or more of the plurality of end user software applications further updates, modifies, or adds to the information about the telephonic communication stored in the record after the information about the telephonic communication stored in the assigned portion of the memory cache has been previously modified. In various embodiments, the information about the telephonic communication stored in the record has been previously modified by another respective one or more of the plurality of end user software applications or by the end user.

Preferably, the information about the telephonic communication includes one or more of the following: a physical address of the third party, an email address of the third party, a name of the company with which the third party works, a job title of the third party, a communication history between the end user and the third party, a communication history between the company with which the end user works and the third party, a communication history between the company with which the third party works and the end user, notes regarding the third party, links to databases having additional information about the third party or about the company with which the third party works, biographical information about the third party, current geographical location of the third party or of the company with which the third party works, a graphical representation or image of the third party, documents available to the end user and related to the third party or related to the company with which the third party works, and emails available to the end user and related to the third party or related to the company with which the third party works. Preferably, such information is provided by the end user or provided by one or more of the plurality of end user software applications.

In yet a further feature, the client side integration proxy generates an interactive user interface to enable the end user to access and update, modify, or add to information about the telephonic communication stored in the record. In one embodiment, the interactive user interface is displayed on the end user's computing device. Preferably, the interactive user interface (i) runs in a software application installed on the end user's computing device or (ii) is an Internet-based application accessed by the end user's computing device. In another embodiment, the interactive user interface is displayed on the end user's VoIP-enabled client device. Preferably, the interactive user interface (i) runs in a software application on the end user's VoIP-enabled client device or (ii) is an Internet-based application accessed by the end user's VoIP-enabled client device.

In a further embodiment, the client side integration proxy enables the end user to access and update, modify, or add to information about the telephonic communication stored in the record before, during, or after the telephonic communication.

In another feature, the client side integration proxy periodically obtains additional data about the telephonic communication from the hosted VoIP PBX through the API of the hosted VoIP PBX. Preferably, the information about the telephonic communication stored in the record is updated to include the additional data about the telephonic communication obtained from the hosted VoIP PBX.

In one embodiment, the end user's computing device comprises the end user's VoIP-enabled client device. In some embodiments, the end user initiates the telephonic communication with the third party. In other embodiments, the third party initiates the telephonic communication with the end user.

A fourth aspect of the technology disclosed herein is directed to a system for collecting information associated with a telephonic communication made through a voice over Internet Protocol (VoIP) system by dynamically integrating a plurality of end user software applications including a VoIP-enabled client device associated with an end user, a hosted VoIP private branch exchange (PBX) in electronic communication with the VoIP-enabled client device for handling and managing the end user's side of a telephonic communication, a client side integration proxy in electronic communication with the hosted VoIP PBX through an application programming interface (API) of the hosted VoIP PBX, and a data store in electronic communication with the client side integration proxy containing data obtained from the hosted VoIP PBX for each telephonic communication handled and managed by the hosted VoIP PBX. The client side integration proxy including its own API for communicating and exchanging data with the plurality of end user software applications, and a memory cache accessible by the plurality of end user software applications through the API of the client side integration proxy. Software executing on the client side integration proxy receives a request from the end user to retrieve information about a previous telephonic communication, retrieves data related to the previous telephonic communication from the data store, assigns a portion of the memory cache for storing the retrieved data about the previous telephonic communication, enables one or more of the plurality of end user software applications to access the data about the previous telephonic communication currently stored in the assigned portion of the memory cache, enables one or more of the plurality of end user software applications, in response to the data about the previous telephonic communication accessed from the assigned portion of the memory cache, to update, modify, or add to the data about the previous telephonic communication currently stored in the assigned portion of the memory cache based on data relevant to the previous telephonic communication obtainable or generated by the one or more of the plurality of end user software applications, and retrieves and presents the supplemented data about the previous telephonic communication to the end user.

In a feature, if the data related to the previous telephonic communication stored in the assigned portion of the memory cache is updated, modified, or added to, the client side integration proxy notifies one or more of the plurality of end user software applications about the modified information and requests the one or more of the plurality of end user software applications further to update, modify, or add to the information about the previous telephonic communication stored in the assigned portion of the memory cache in response to the modified information.

In another feature, the client side integration proxy enables one or more of the plurality of end user software applications to access the data related to the previous telephonic communication stored in the assigned portion of the memory cache (i) by pushing at least a portion of the stored information to one or more of the plurality of end user software applications or (ii) by polling and pulling at least a portion of the stored information from the assigned portion of the memory cache.

In yet another feature, a respective one or more of the plurality of end user software applications further updates, modifies, or adds to the data related to the previous telephonic communication stored in the assigned portion of the memory cache after the data related to the previous telephonic communication stored in the assigned portion of the memory cache has been previously modified.

Preferably, the supplemented information about the previous telephonic communication comprises one or more of the following provided by one or more of the plurality of end user software applications: a physical address of the third party, an email address of the third party, a name of the company with which the third party works, a job title of the third party, a communication history between the end user and the third party, a communication history between the company with which the end user works and the third party, a communication history between the company with which the third party works and the end user, notes regarding the third party, links to databases having additional information about the third party or about the company with which the third party works, biographical information about the third party, current geographical location of the third party or of the company with which the third party works, a graphical representation or image of the third party, documents available to the end user and related to the third party or related to the company with which the third party works, and emails available to the end user and related to the third party or related to the company with which the third party works.

Preferably, the data obtained from the hosted VoIP PBX includes one or more of the following: a phone number of the third party, a name of the third party, an IP address of the device being used by the third party for the telephonic communication, a phone number or extension of the end user, a name of the end user, an IP address of the client device of the end user, an indication whether a portion or all of the telephonic communication is encrypted, an indication whether a portion or all of the telephonic communication is using a secured communication line, an indication whether the telephonic communication is inbound to or outbound from the hosted VoIP PBX, an indication whether the telephonic communication is being monitored, an indication whether the telephonic communication is being recorded, an indication of call ringing, an indication of call answered, and an indication of call disconnected.

A fifth aspect of the technology disclosed herein is directed to a system for collecting information associated with a telephonic communication made through a voice over Internet Protocol (VoIP) system by dynamically integrating a plurality of end user software applications including a VoIP-enabled client device associated with an end user, a hosted VoIP private branch exchange (PBX) in electronic communication with the VoIP-enabled client device for handling and managing the end user's side of a telephonic communication, and a client side integration proxy in electronic communication with the hosted VoIP PBX through an application programming interface (API) of the hosted VoIP PBX. The client side integration proxy includes its own API for communicating and exchanging data with the plurality of end user software applications, a memory cache accessible by the plurality of end user software applications through the API of the client side integration proxy, and a data store for storing records containing information about telephonic communications that are handled and managed by the hosted VoIP PBX. Software executing on the client side integration proxy detects a telephonic communication based on data obtained from the hosted VoIP PBX through the API of the hosted VoIP PBX for each telephonic communication handled and managed by the hosted VoIP PBX, assigns a portion of the data store as a record for storing information about the telephonic communication for each telephonic communication handled and managed by the hosted VoIP PBX, wherein the information about the telephonic communication initially stored in the record includes the data obtained from the hosted VoIP PBX, receives a request from the end user to retrieve information about a previous telephonic communication, retrieves information from the record associated with the previous telephonic communication stored in the data store, assigns a portion of the memory cache for storing the retrieved information about the previous telephonic communication, enables the one or more of the plurality of end user software applications to access the information about the previous telephonic communication stored in the assigned portion of the memory cache, enables one or more of the plurality of end user software applications to update, modify, or add to the information about the previous telephonic communication stored in the memory cache based on data relevant to the previous telephonic communication obtainable or generated by the one or more of the plurality of end user software applications, and retrieves and presents the supplemented information about the previous telephonic communication to the end user.

In a feature, if the data related to the previous telephonic communication stored in the assigned portion of the memory cache is updated, modified, or added to, the client side integration proxy notifies one or more of the plurality of end user software applications about the modified information and requests the one or more of the plurality of end user software applications further to update, modify, or add to the information about the previous telephonic communication stored in the assigned portion of the memory cache in response to the modified information.

In another feature, the client side integration proxy enables one or more of the plurality of end user software applications to access the data related to the previous telephonic communication stored in the assigned portion of the memory cache (i) by pushing at least a portion of the stored information to one or more of the plurality of end user software applications or (ii) by polling and pulling at least a portion of the stored information from the assigned portion of the memory cache.

In a further feature, a respective one or more of the plurality of end user software applications further updates, modifies, or adds to the data related to the previous telephonic communication stored in the assigned portion of the memory cache after the data related to the previous telephonic communication stored in the assigned portion of the memory cache has been previously modified.

Preferably, the supplemented information about the previous telephonic communication includes one or more of the following provided by one or more of the plurality of end user software applications: a physical address of the third party, an email address of the third party, a name of the company with which the third party works, a job title of the third party, a communication history between the end user and the third party, a communication history between the company with which the end user works and the third party, a communication history between the company with which the third party works and the end user, notes regarding the third party, links to databases having additional information about the third party or about the company with which the third party works, biographical information about the third party, current geographical location of the third party or of the company with which the third party works, a graphical representation or image of the third party, documents available to the end user and related to the third party or related to the company with which the third party works, and emails available to the end user and related to the third party or related to the company with which the third party works.

Preferably, the data obtained from the hosted VoIP PBX includes one or more of the following: a phone number of the third party, a name of the third party, an IP address of the device being used by the third party for the telephonic communication, a phone number or extension of the end user, a name of the end user, an IP address of the client device of the end user, an indication whether a portion or all of the telephonic communication is encrypted, an indication whether a portion or all of the telephonic communication is using a secured communication line, an indication whether the telephonic communication is inbound to or outbound from the hosted VoIP PBX, an indication whether the telephonic communication is being monitored, an indication whether the telephonic communication is being recorded, an indication of call ringing, an indication of call answered, and an indication of call disconnected.

A sixth aspect of the technology disclosed herein is directed to a system for collecting information associated with a telephonic communication made through a voice over Internet Protocol (VoIP) system by dynamically integrating a plurality of end user software applications including a VoIP-enabled client device associated with an end user, a hosted VoIP private branch exchange (PBX) in electronic communication with the VoIP-enabled client device for handling and managing the end user's side of a telephonic communication including an application programming interface (API) and a data store for storing data related to each telephonic communication handled and managed by the hosted VoIP PBX, and a client side integration proxy in electronic communication with the hosted VoIP PBX through the API of the hosted VoIP PBX. The client side integration proxy including its own API for communicating and exchanging data with the plurality of end user software applications, and a memory cache accessible by the plurality of end user software applications through the API of the client side integration proxy. Software executing on the client side integration proxy receives a request from the end user to retrieve information about a previous telephonic communication, retrieves data associated with the previous telephonic communication from the data store through the API of the hosted VoIP PBX, assigns a portion of the memory cache for storing the retrieved data about the previous telephonic communication, enables the one or more of the plurality of end user software applications to access the data about the previous telephonic communication stored in the assigned portion of the memory cache, enables one or more of the plurality of end user software applications to update, modify, or add to the data about the previous telephonic communication stored in the memory cache based on information relevant to the previous telephonic communication obtainable or generated by the one or more of the plurality of end user software applications, and retrieves and presents the supplemented data about the previous telephonic communication to the end user.

In a feature, if the data related to the previous telephonic communication stored in the assigned portion of the memory cache is updated, modified, or added to, the client side integration proxy notifies one or more of the plurality of end user software applications about the modified information and requests the one or more of the plurality of end user software applications further to update, modify, or add to the information about the previous telephonic communication stored in the assigned portion of the memory cache in response to the modified information.

In another feature, the client side integration proxy enables one or more of the plurality of end user software applications to access the data related to the previous telephonic communication stored in the assigned portion of the memory cache (i) by pushing at least a portion of the stored information to one or more of the plurality of end user software applications or (ii) by polling and pulling at least a portion of the stored information from the assigned portion of the memory cache.

In a further feature, a respective one or more of the plurality of end user software applications further updates, modifies, or adds to the data related to the previous telephonic communication stored in the assigned portion of the memory cache after the data related to the previous telephonic communication stored in the assigned portion of the memory cache has been previously modified.

Preferably, the supplemented information about the previous telephonic communication includes one or more of the following provided by one or more of the plurality of end user software applications: a physical address of the third party, an email address of the third party, a name of the company with which the third party works, a job title of the third party, a communication history between the end user and the third party, a communication history between the company with which the end user works and the third party, a communication history between the company with which the third party works and the end user, notes regarding the third party, links to databases having additional information about the third party or about the company with which the third party works, biographical information about the third party, current geographical location of the third party or of the company with which the third party works, a graphical representation or image of the third party, documents available to the end user and related to the third party or related to the company with which the third party works, and emails available to the end user and related to the third party or related to the company with which the third party works.

Preferably, the data obtained from the hosted VoIP PBX includes one or more of the following: a phone number of the third party, a name of the third party, an IP address of the device being used by the third party for the telephonic communication, a phone number or extension of the end user, a name of the end user, an IP address of the client device of the end user, an indication whether a portion or all of the telephonic communication is encrypted, an indication whether a portion or all of the telephonic communication is using a secured communication line, an indication whether the telephonic communication is inbound to or outbound from the hosted VoIP PBX, an indication whether the telephonic communication is being monitored, an indication whether the telephonic communication is being recorded, an indication of call ringing, an indication of call answered, and an indication of call disconnected Embodiments of the technology disclosed herein can be implemented in digital electronic circuitry, or in computer hardware, firmware, software, or in combinations of one or more of the above. The technology, systems, and methods described herein may be implemented as a computer program product, i.e., a computer program tangibly embodied in an information carrier, e.g., in a machine-readable storage device or in a propagated signal, for execution by, or to control the operation of, data processing apparatuses, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps described herein can be performed by one or more programmable processors executing a computer program to perform functions or process steps or provide features described herein by operating on input data and generating output. Method steps can also be performed or implemented, in association with the disclosed systems, methods, and/or processes, in, as, or as part of special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with an end user, the technology, systems, and methods described herein, or components or portions thereof, can be implemented on a computer or computing device having a display, e.g., a cathode ray tube (CRT) or liquid crystal display (LCD) monitor or comparable graphical user interface, for displaying information to the user, and a keyboard and/or a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The technology, systems, and methods described herein, or components or portions thereof, can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network, whether wired or wireless. Examples of communication networks include a local area network (LAN) and a wide area network (WAN), e.g., the Internet, Intranet using any available communication means, e.g., Ethernet, Bluetooth, etc.

The computing system can include clients and servers. A client and server are generally remote from each other and typically interact through a communication network. The relationship of client and server arises by virtue of computer programs running on the respective computers and having a client-server relationship to each other.

The technology, systems, and methods described herein, or components or portions thereof, also encompass computer-readable media having computer-executable instructions for performing methods, steps, or processes, and computer networks and other systems that implement the methods, steps, or processes described herein.

The above aspects, features, elements, components and embodiments as well as additional features and aspects of the technology, systems, and methods described herein, or components or portions thereof, are disclosed herein or will become apparent from the following description of preferred embodiments thereof.

This summary is provided to introduce a selection of aspects and concepts in a simplified form that are further described below in the detailed description. This summary is not necessarily intended to identify all key or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In addition, further features and benefits of the present technology will be apparent from a detailed description of preferred embodiments thereof taken in conjunction with the following drawings, wherein similar elements are referred to with similar reference numbers, and wherein:

FIG. 5 illustrates a plurality of Javascript interfaces and API calls to the client-side integration proxy in accordance with the system illustrated in FIG. 3;

DETAILED DESCRIPTION OF PREFERRED EMBODIMENTS

Figure 1:
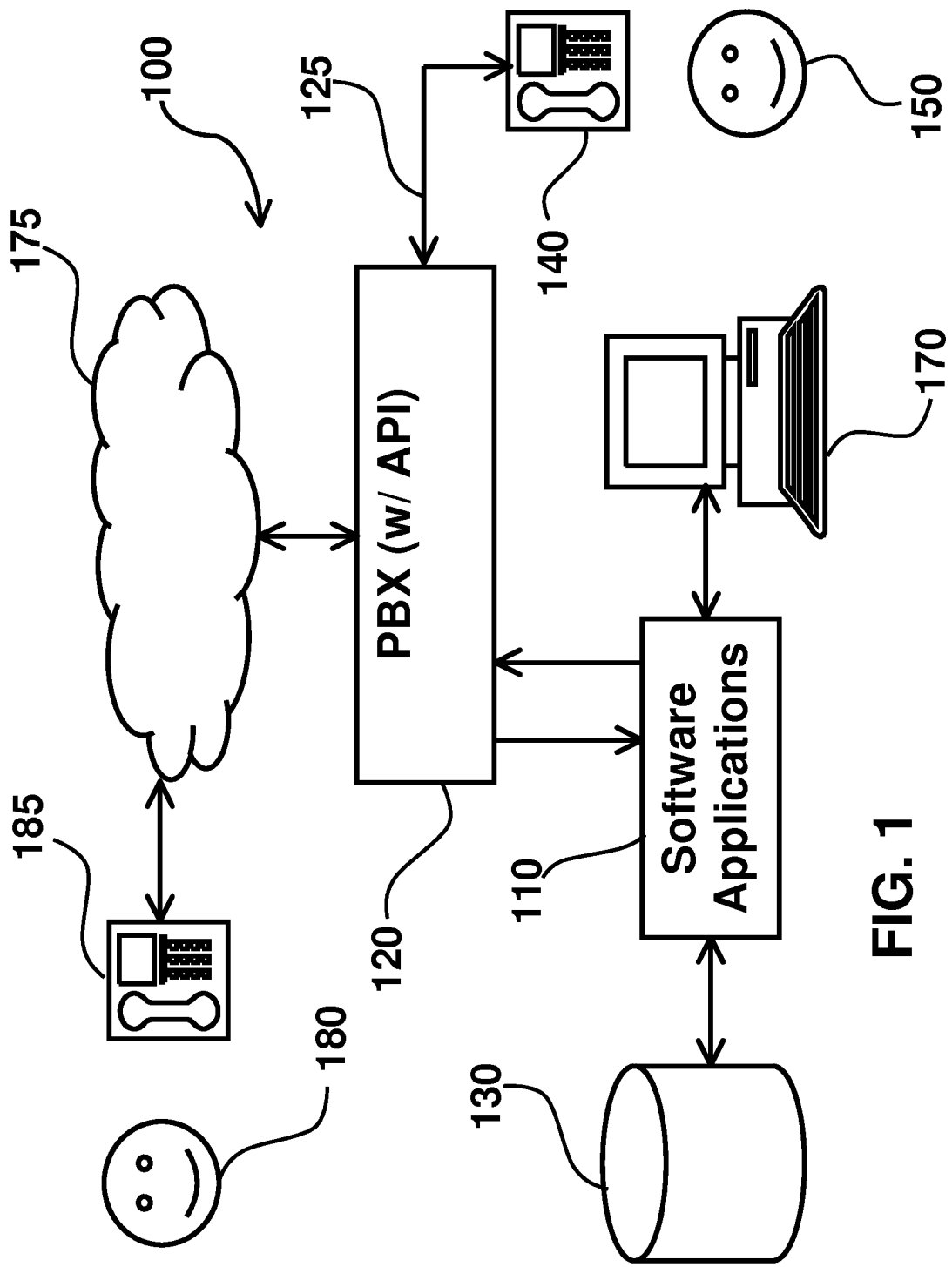
FIG. 1 illustrates an existing, traditional system in which there is direct integration between a software application and a PBX system.

Before the present technologies, systems, and methods are disclosed and described in greater detail hereinafter, it is to be understood that the present technologies, systems, and methods are not limited to specific methods, specific components, or particular implementations. It is also to be understood that the terminology used herein is for the purpose of describing particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described event or circumstance may or may not occur, and the description includes instances in which the event or circumstance occurs and instances where it does not.

Throughout the description and claims of this specification, the word "comprise" and variations of the word, such as "comprising" and "comprises," mean "including but not limited to," and is not intended to exclude, for example, other components, integers, elements, features, or steps. "Exemplary" means "an example of" and is not necessarily intended to convey an indication of preferred or ideal embodiments. "Such as" is not used in a restrictive sense, but for explanatory purposes only.

Disclosed herein are components that can be used to perform the herein described technologies, systems, and methods. These and other components are disclosed herein, and it is understood that when combinations, subsets, interactions, groups, etc. of these components are disclosed that while specific reference to each various individual and collective combinations and permutation of these may not be explicitly disclosed, each is specifically contemplated and described herein, for all technologies, methods, and systems. This applies to all aspects of this specification including, but not limited to, steps in disclosed methods. Thus, if there are a variety of additional steps that can be performed, it is understood that each of the additional steps can be performed with any specific embodiment or combination of embodiments of the disclosed technologies, methods, and systems.

As will be appreciated by one skilled in the art, the present technologies, methods, and systems may take the form of an entirely new hardware embodiment, an entirely new software embodiment, or an embodiment combining new software and hardware aspects. Furthermore, the present technologies, methods, and systems may take the form of a computer program product on a computer-readable storage medium having computer-readable program instructions (e.g., computer software) embodied in the storage medium. More particularly, the present technologies, methods, and systems may take the form of web-implemented computer software. Any suitable computer-readable storage medium may be utilized including hard disks, non-volatile flash memory, CD-ROMs, optical storage devices, and/or magnetic storage devices, and the like. An exemplary computer system is described below.

Embodiments of the present technologies, methods, and systems are described below with reference to block diagrams and flowchart illustrations of methods, systems, apparatuses, and computer program products. It will be understood that each block of the block diagrams and flow illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 2:
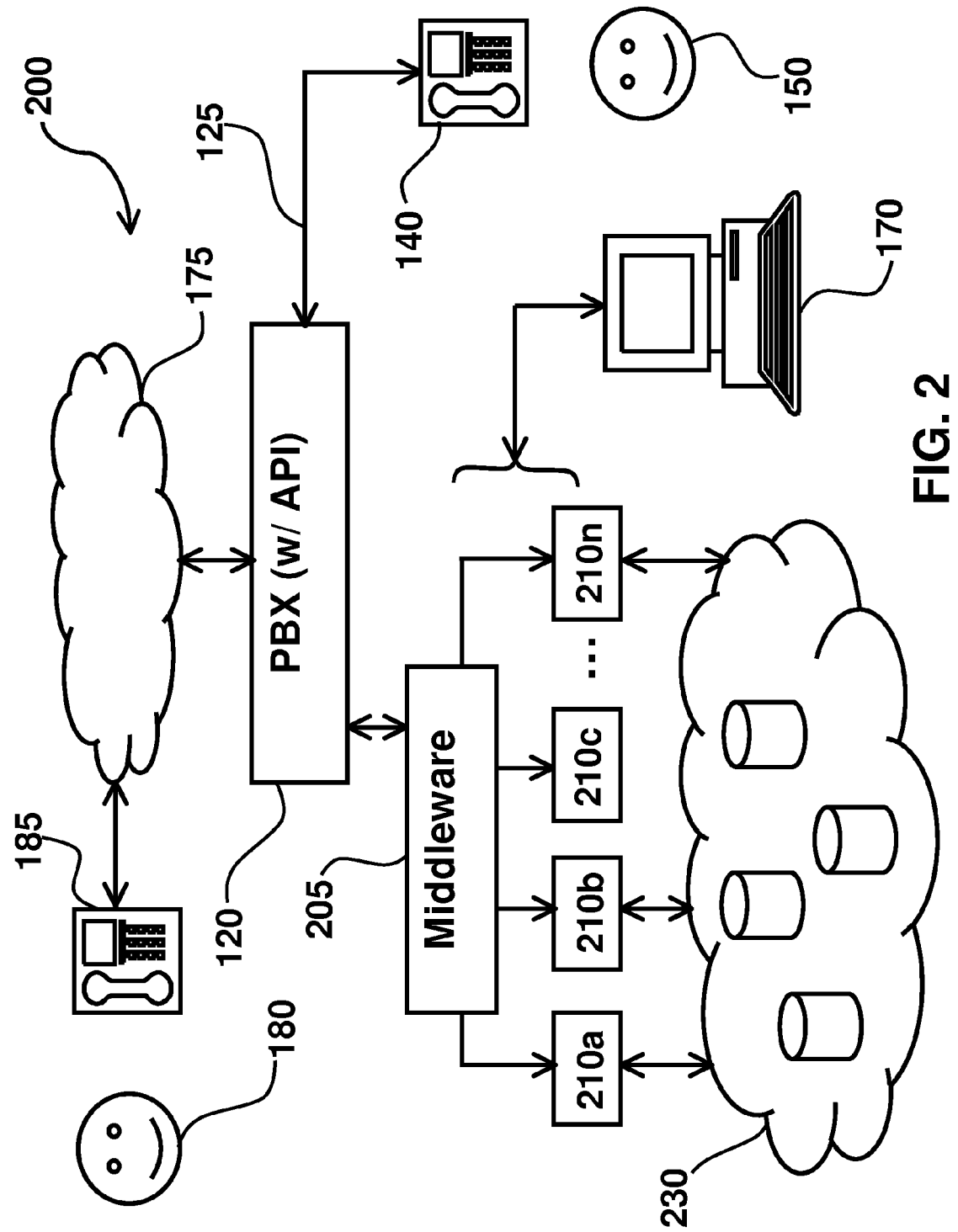
FIG. 2 illustrates an existing, traditional system in which there is indirect integration between a plurality of software applications and a PBX system using middleware.

Turning now to the drawings, FIGS. 1 and 2 illustrate known, conventional ways for integrating software applications and data with a hosted or hardware-based PBX having an Application Programming Interface (API). Specifically, FIG. 1 illustrates a simple system 100 in which there is direct integration between an end user's (business) software application 110 and the PBX 120. The end user 150 has a client device 140, such as a conventional land-line phone, VoIP phone, IP phone, SIP phone, and the like, which is in electronic communication with the PBX 120 for making and receiving phone calls. The PBX 120 handles and manages the end user's side of any phone call 125 to or from the end user 150. The third party 180 receives or places a phone call with the end user 150 using any conventional calling device 185, such as a land line phone, mobile or cellular phone, VoIP phone, IP phone, SIP phone, and the like. The third party's calling device 185 communicates with the PBX 120 through a telephonic network 175, such as a PSTN, cellular network, the Internet, or the like. Preferably, the end user 150 also has a conventional computer or computing device 170 having a display or other graphical user interface. Typically, the software application 110 is running on or otherwise accessible to the computer or computing device 170, and is able to generate or display information to the end user 150 on the display or user interface of the computing device 170. The software application 110 preferably has access to memory, data stores, or one or more databases 130 of information or is capable of generating or otherwise obtaining data relevant to the end user, the third party, and any prior calls between the end user and third party in response to notification of the new phone call between the end user 150 and the third party 180.

In practice, the PBX 120 communicates electronically (and directly) with the software application 110, through the API of the PBX, when there is a new event (e.g. in-coming call, out-going call, etc.) associated with the end user 150. For example, when there is a call or telephonic communication coming in from the third party 180 and intended for the end user 150, the PBX 120 provides the software application 110 with the phone number (or extension) of the end user 150 being called (to identify the relevant end user associated with the phone call), as well as the phone number and caller ID of the third party 180 initiating the call. The software application 110 then searches its memory, data store, or other available database(s) 130 for any additional information or data that may be obtainable about the third party 180 or any prior calls between the end user and third party, based on the phone number and caller ID of the third party 180 and the identity of the end user provided by the PBX 120. Alternatively, the software application 110 generates or searches for additional information or data about the third party caller 180. Any data retrieved or generated/obtained by the software application 110 about the third party 180 is then available for presentation (e.g., in a graphic window display generated by the software application 110) to the end user 150 on the display or user interface of the computing device 170.

When there is an out-going call or telephonic communication initiated by the end user 150, the end user's phone number (or extension number), plus the desired (third party) recipient's phone number, are provided by the client device 140 to the PBX 120. The PBX 120 then places the call to the third party 180 from the end user's device or extension. Upon initiation of the call to the third party 180, the PBX 120 provides the software application 110 with the phone number and caller ID of the third party 180 being called, as well as the phone number or extension of the end user 150 initiating the call. The software application 110 then searches its memory, data store, or other available database(s) 130 for any additional information or data that may be obtainable about the third party 180 or any prior calls between the end user and third party, based on the phone number and caller ID of the third party 180 and the identity of the end user provided by the PBX 120. Alternatively, the software application 110 generates or searches for additional information or data about the third party 180. Any data retrieved or generated/obtained by the software application 110 relevant to the third party 180 is then available for presentation (e.g., in a window generated by the software application 110) to the end user 150 on the display or user interface of the computing device 170.

In an alternative embodiment, upon request for data about the third party 180 by the end user 150, interacting directly with the software application 110 using the computer or computing device 170 (e.g., through a conventional software interaction window generated by the software application 110), the software application 110 searches its memory, data store, or other available database(s) 130 for any additional information or data that may be obtainable about the third party 180 or about prior calls between the end user and third party, or generates or searches for additional information or data about the third party 180 based on the phone number or name of the third party 180 being called (or looked up before a call) by the end user 150. Any data retrieved from the memory, data stores, or other available database(s) 130 or generated/obtained by the software application 110 about the third party 180 is then available for presentation to the end user 150 on the display or user interface of the computing device 170 before, during, or after the phone call. If and when a call is placed, the PBX 120 confirms initiation of the call, providing the software application 110 with the phone number and caller ID of the third party 180 being called, as well as the phone number or extension of the end user 150 initiating the call.

FIG. 2 illustrates another conventional system 200 in which there is indirect integration between a plurality of end user's (business) software applications 210a,b,c . . . n and the PBX 120, through a middleware system or software 205. As shown already in FIG. 1, the end user 150 has a client device 140, such as a conventional land-line phone, VoIP phone, IP phone, SIP phone, or the like, which is in electronic communication with the PBX 120 for making and receiving phone calls. The PBX 120 handles and manages the end user's side of any phone call 125 to or from the end user 150. The third party 180 receives or places a phone call with the end user 150 using any conventional calling device 185, such as a land line phone, mobile or cellular phone, VoIP phone, IP phone, SIP phone, or the like. The third party's calling device 185 communicates with the PBX 120 through a telephonic network 175, such as a PSTN, cellular network, the Internet, or the like. The end user 150 also has a conventional computer or computing device 170 with a display or other graphical user interface.

Typically, one or more of the plurality of software applications 210a,b,c . . . n are running on or otherwise accessible to the computer or computing device 170, and are able to generate or display information to the end user 150 on the display or user interface of the computing device 170. The plurality of software applications 210a,b,c . . . n preferably have access to memory, data stores, or one or more databases 230 of information or are capable of generating or otherwise obtaining data relevant to the end user, the third party, and any prior calls between the end user and third party in response to notification of the new phone call between the end user 150 and the third party 180.

In practice, the PBX 120 communicates electronically with the middleware system or software 205, through the API of the PBX, when there is a new event (e.g. in-coming call, out-going call, etc.) associated with the end user 150. For example, when there is a call or telephonic communication coming in from the third party 180 and intended for the end user 150, the PBX 120 provides the middleware system or software 205 with the phone number (or extension) of the end user 150 being called (to identify the relevant end user associated with the phone call), as well as the phone number and caller ID of the third party 180 initiating the call. The middleware system or software 205 then provides one or more of the plurality of software applications 210a,b,c . . . n with the PBX-provided information about the third party and the end user. The one or more of the plurality of software applications 210a,b,c . . . n then search available memory, data stores, or database(s) 230 for any additional information or data that may be obtainable about the third party 180 or about prior calls between the end user and third party, based on the phone number and caller ID of the third party 180 and the identity of the end user provided by the PBX 120. Alternatively, one or more of the plurality of software applications 210a,b,c . . . n generate or searches for additional information or data about the third party 180. Any data retrieved from memory, data stores, or one or more additional database(s) 230 or generated/obtained by the one or more of the plurality of software applications 210a,b,c . . . n about the third party 180 or about prior calls between the end user and third party is then available for presentation to the end user 150 on the display or user interface of the computing device 170, for each of the plurality of software applications 210a,b,c . . . n that are running on or otherwise accessible to the end user's computer or computing device 170. Importantly, the one or more of the plurality of software applications 210a,b,c . . . n only receive: (a) information from the middleware system or software 205 provided by the PBX 120 about the third party, the end user, and the current communication between the third party and end user, or (b) for each respective software application, information previously provided to each respective software application or information input directly by the end user 150 through the interface of each respective software application 210a,b,c . . . n running on or accessible by the computing device 170. There is no mechanism for the middleware system 205 or for each of the plurality of software applications 210a,b,c . . . n to exchange or share information with each other dynamically—except for those specific software applications that are already integrated and configured to exchange information with each other independently of and separately from any communication involving the PBX 120.

When there is an out-going call or telephonic communication initiated by the end user 150, the end user's phone number (or extension number), plus the desired (third party) recipient's phone number, are provided by the client device 140 to the PBX 120. The PBX 120 then places the call to the third party 180 from the end user's device or extension. Upon initiation of the call to the third party 180, the PBX 120 provides the middleware system or software 205 with the phone number and caller ID of the third party 180 being called, as well as the phone number or extension of the end user 150 initiating the call. The middleware system or software 205 then provides one or more of the plurality of software applications 210a,b,c . . . n with the PBX-provided information about the third party and the end user. The one or more of the plurality of software applications 210a,b,c . . . n then search available memory, data stores, or database(s) 230 for any additional information or data that may be obtainable about the third party 180 or about prior calls between the end user and third party, based on the phone number and caller ID of the third party 180 and the identity of the end user provided by the PBX 120. Alternatively, one or more of the plurality of software applications 210a,b,c . . . n generate or search for additional information or data about the third party 180. Any data retrieved from memory, data stores, or database(s) 230 or generated/obtained by the one or more of the plurality of software applications 210a,b,c . . . n about the third party 180 or about prior calls between the end user and third party is then available for presentation to the end user 150 on the display or user interface of the computing device 170, for each of the plurality of software applications 210a,b,c . . . n that are running on or otherwise accessible to the end user's computer or computing device 170. Importantly, the one or more of the plurality of software applications 210a,b,c . . . n only receive: (a) information from the middleware system or software 205 provided by the PBX 120 about the third party, the end user, and the current communication between the third party and end user, or (b) for each respective software application, information previously provided to each respective software application or information input directly by the end user 150 through the interface of each respective software application 210a,b,c . . . n running on or accessible by the computing device 170. There is no mechanism for the middleware system 205 or for each of the plurality of software applications 210a,b,c . . . n to exchange or share information with each other dynamically—except for those specific software applications that are already integrated and configured to exchange information with each other independently of and separately from any communication involving the PBX 120.

In an alternative embodiment, upon request for data about the third party 180 by the end user 150, interacting directly with one or more of the plurality of software applications 210a,b,c . . . n using the computer or computing device 170, the one or more of the plurality of software applications 210a,b,c . . . n can search any available memory, data stores, or database(s) 230 for any additional information or data that may be obtainable about the third party 180 or, in some cases, one or more of the plurality of software applications 210a,b,c . . . n can generate or search for additional information or data about the third party 180 based on the phone number or name of the third party 180 being called (or looked up before a call) by the end user 150. Any data retrieved from the available memory, data stores, or database(s) 230 or generated/obtained by the one or more of the plurality of software applications 210a,b,c . . . n about the third party 180 is then available for presentation to the end user 150 on the display or user interface of the computing device 170 before, during, or after the phone call. If and when a call is placed, the PBX 120 confirms initiation of a call, providing the middleware system or software 205 with the phone number and caller ID of the third party 180 being called, as well as the phone number or extension of the end user 150 initiating the call. The middleware system or software 205 then provides one or more of the plurality of software applications 210a,b,c . . . n with the PBX-provided information about the third party and the end user. Importantly, again, there is no mechanism for the middleware system 205 or for each of the plurality of software applications 210a,b,c . . . n to exchange or share information with each other dynamically—except for those specific software applications that are already integrated and configured to exchange information with each other independently of and separately from any communication involving the PBX 120.

Figure 3:
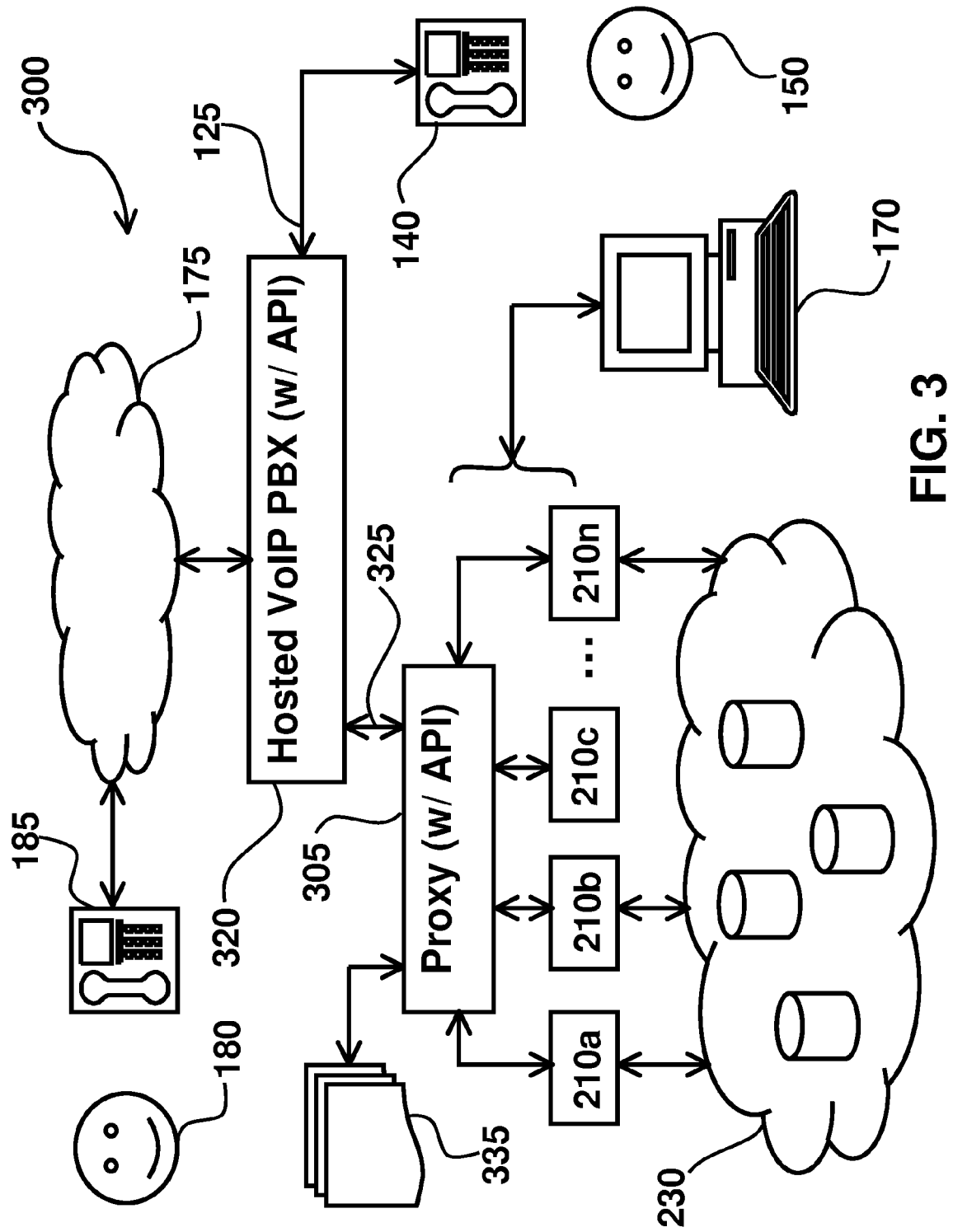
FIG. 3 illustrates an embodiment of the present technology in which there is synchronized integration between a plurality of software applications and a PBX system using a client-side integration proxy.

FIG. 3, in contrast with the existing, traditional systems described above in FIGS. 1 and 2, illustrates a preferred system 300, described hereinafter, in which there is integration and data synchronization between and among one or more of a plurality of software applications 210a,b,c . . . n available to the end user 150 using a client-side integration proxy 305. The client-side integration proxy 305 communicates electronically and directly with a hosted, VoIP PBX 320, through the API of the hosted, VoIP PBX 320, when there is a new event (e.g., in-coming call, out-going call, etc.). The client-side integration proxy 305 has its own API and communicates electronically and directly through its API with the one or more plurality of software applications 210a,b,c . . . n.

The client-side integration proxy 305 also includes or has access to a memory cache 335. Preferably, the client-side integration proxy 305 assigns or dedicates a portion (e.g., record, file, etc.) of the memory cache 335 for storing data and information associated with each respective in-coming or out-going call or telephonic communication associated with the specific end user 150 authenticated to the client-side integration proxy 305 and handled by the hosted, VoIP PBX 320 and synchronized with the client-side integration proxy 305.

Similar to what is shown in FIGS. 1 and 2, the end user 150 of FIG. 3 has a client device 140, such as a conventional land-line phone, VoIP phone, IP phone, SIP phone, and the like, which is in electronic communication with the hosted, VoIP PBX 320 for making and receiving phone calls or telephonic communications. The hosted, VoIP PBX 320 handles and manages the end user's side of any phone call 125 to or from the end user 150. The third party 180 receives or places a phone call with the end user 150 using any conventional calling device 185, such as a land line phone, mobile or cellular phone, VoIP phone, IP phone, SIP phone, and the like. The third party's calling device 185 communicates with the hosted, VoIP PBX 320 through a telephonic network 175, such as a PSTN, cellular network, the Internet, and the like. The end user 150 also has a conventional computer or computing device 170 with a display or other graphical user interface.

Typically, the plurality of software applications 210a,b,c . . . n are running on or otherwise accessible to the computer or computing device 170 and are able to generate or display information to the end user 150 directly on the display or user interface of the computing device 170. The plurality of software applications 210a,b,c . . . n preferably have access to memory, data stores, or one or more databases 230 of information and/or are capable of generating or otherwise obtaining data relevant to the end user, the third party, and any calls between the end user and third party, in a manner described in greater detail hereinafter.

In practice, the hosted, VoIP PBX 320 communicates electronically with the client-side integration proxy 305 through the API of the hosted, VoIP PBX 320, whenever there is a new event (e.g., in-coming call, out-going call, conference call, termination of call, etc.) associated with the end user 150. For example, when there is a call or telephonic communication coming in from the third party 180 and intended for the end user 150, the hosted, VoIP PBX 320 provides the client-side integration proxy 305 with the phone number (or extension) of the end user 150 being called (to identify the relevant end user associated with the phone call), as well as the phone number and caller ID of the third party 180 initiating the call. Preferably, the client-side integration proxy 305 integrates directly with the hosted, VoIP PBX 320 through the API of the hosted, VoIP PBX 320 using the login or sign-in credentials of the end user 150.

For each end user session or event (e.g., in-coming call, out-going call, conference call, etc. involving the end user 150), there is preferably only one active connection/electronic communication pathway 325 between the client-side integration proxy 305 and the API of the hosted, VoIP PBX 320, regardless of the number of software applications 210a,b,c . . . n integrated with or otherwise in electronic communication with the API of the client-side integration proxy 305, providing better scalability and performance. An unlimited number of software applications 210a,b,c . . . n can be integrated with the client-side integration proxy 305 without increasing the load or workload on the hosted, VoIP PBX 320 or its API. Any additional computing resources (e.g., servers, memory, processors, computing power, communication channels, etc.) required for the integration and intercommunications between and among all of the one or more of the plurality of software applications 210a,b,c . . . n only need be located on the client side of the system 300. Additional computing resources are not required by the PBX 320 or on the PBX side of the system 300 to run, operate, or support the hosted, VoIP PBX 320 since the amount of data and information flowing between the client-side integration proxy 305 and the hosted, VoIP PBX 320 or its API is unaffected by the number of end user software applications 210a,b,c . . . n interacting with the client-side integration proxy 305 or the amount of information and data flowing (i) through the client-side integration proxy 305, (ii) between the plurality of software applications 210a,b,c . . . n, and their memory, data stores, or databases 230, and memory cache 335, or (iii) available for presentation to the end user 150 on the display or user interface of the computing device 170 before, during, or after the phone call.

The client-side integration proxy 305 preferably assigns and maintains a portion of memory cache 335 to store relevant data and information for each phone call incoming to or outgoing from the end user 150 based on calls involving the end user and being managed or handled by the hosted, VoIP PBX 320. Software applications 210a,b,c . . . n integrated with the client-side integration proxy 305 are adapted or configured to access and retrieve data or information associated with any respective VoIP communication involving the end user from the relevant portion, file, or record of the memory cache 335 assigned to that respective VoIP communication. Further, such software applications 210a,b,c . . . n integrated with the client-side integration proxy 305 are adapted or configured to update, add to, or modify data or information associated with a respective VoIP communication involving the end user 150 in the relevant portion, file, or record of the memory cache 335 assigned to the respective VoIP communication based on data and information previously retrieved or retrievable from the relevant portion, file, or record of the memory cache 335 assigned to the respective VoIP communication.

The software applications 210a,b,c . . . n integrated with the client-side integration proxy 305 communicate with the API of the client-side integration proxy 305, which provides access to the relevant portion, file, or record of the memory cache 335 assigned to each respective VoIP communication, which allows the integrated software applications 210a,b,c . . . n to access or read data from the memory cache 335 for every phone call involving the end user 150 and to update, modify, add to, or otherwise enrich the data stored in the memory cache 335 and associated with each respective VoIP communication involving the end user 150. Integrated software applications 210a,b,c . . . n can also update, modify, add to, or otherwise enrich the data stored in the memory cache 335 for any phone call involving the end user 150, and any data added or modified in the memory cache 335 is then available to and usable by any of the other integrated software applications 210a,b,c . . . n through the API of the client-side integration proxy 305.

The API of the client-side integration proxy 305 allows integrated software applications 210a,b,c . . . n to receive new information via either pull or push mechanisms. To pull data or poll for data changes, any of the plurality of integrated software applications 210a,b,c . . . n can read data about a respective phone call or VoIP communication involving the end user 150 through the API of the client-side integration proxy 305. To receive push notification of new data or events, any of the plurality of integrated software applications 210a,b,c . . . n can register methods through the API of the client-side integration proxy 305, and those methods will be invoked when new data is available or when any new events occur, and the relevant information will be passed by the API of the client-side integration proxy 305 to those methods.

In one embodiment, the client-side integration proxy 305 is running on or otherwise accessible to the computer or computing device 170, and is configured to generate or display information to the end user 150 on the display or user interface of the computing device 170. When initiated on a client-computing device 170, the client-side integration proxy 305 performs authentication that establishes a connection with the hosted, VoIP PBX 320 through the API of the hosted, VoIP PBX 320, establishing a session on behalf of the end user 150 and the user's phone extension associated with the client device 140, which is known to the hosted, VoIP PBX 320. The client-side integration proxy 305 runs on the personal computing device 170 and communicates with the API of the hosted, VoIP PBX 320 over the Internet using a standard and secure method for distributed application integration, such as SOAP-based or REST-based web services.

Upon initiation of any incoming, outgoing, or intra-office phone call or telephonic communication 125 occurring through the hosted, VoIP PBX 320 going to or from the end user's extension for which the client-side integration proxy 305 has an established session, the client-side integration proxy 305 receives information through the API of the hosted, VoIP PBX 320 about each phone call/VoIP communication involving the end user 150 and about any new data or events occurring during the life or for the duration of each call. For example, the client-side integration proxy 305 may receive data from the hosted, VoIP PBX 320 indicating the phone number of the caller, the phone number of the third party being called, and the caller ID of the caller—whether the caller is the end user 150 or the third party 180 and regardless of which party initiates the call. Also, the client-side integration proxy 305 may receive indication of events from the hosted, VoIP PBX 320 as they occur, such as Call Ringing, Call Connected, and Call Disconnected.

For every phone call or telephonic communication involving the end user 150, the client-side integration proxy 305 assigns and maintains a dedicated and specific portion of memory cache 335 to store relevant data and information for such phone call, whether incoming to or outgoing from the end user 150. The data received from the hosted, VoIP PBX 320 through its API is stored in the cache 335. Preferably, there is a separate, dedicated, and specific portion of memory cache 335 allocated for storing data and information for each separate phone call associated with the end user 150.

As stated above, the client-side integration proxy 305 provides an API that allows a plurality of software applications 210a,b,c . . . n to integrate directly with the proxy 305 and its memory cache 335; thereby, allowing the plurality of software applications 210a,b,c . . . n to integrate indirectly with the hosted, VoIP PBX 320. The API of the client-side integration proxy 305 allows integrated software applications 210a,b,c . . . n to read individual data elements, such as phone numbers and caller ID strings, from the memory cache 335.

The API of the client-side integration proxy 305 allows integrated software applications 210a,b,c . . . n to update, add to, modify, or otherwise dynamically change data in the memory cache 335 for a specific phone call or telephonic communication associated with the end user 150. For example, upon receiving a phone number read from the memory cache 335, where the phone number is associated with the originator of an inbound call, i.e., third party 180, to the extension of the end user 150, one or more of the plurality of integrated software applications 210a,b,c . . . n might perform a look-up using the third party's phone number and, upon finding some associated data inside the memory, data store, or database(s) 230 accessible by such one or more applications about the third party 180, such as a full name or a company name, the one or more integrated software applications 210a,b,c . . . n could then use the API of the client-side integration proxy 305 to write that data back into the memory cache 335 for that specific call. From there, other integrated software applications 210a,b,c . . . n would then be able to discover and read the full name or the company name from the memory cache 335, using the API of the client-side integration proxy 305. In this way, multiple software applications 210a,b,c . . . n are able to share information with each other through the client-side integration proxy 305 for each phone call, based on data stored and periodically or continuously updated in the memory cache 335. This process can be used and repeated to allow each integrated software application 210a,b,c . . . n to find the most accurate and up-to-date data and information in its own memory, data store, or database(s) 230 to send back to the memory cache 335, and also to enable each integrated software application 210a,b,c . . . n to synchronize and update its own data in its own memory, data store, or database(s) 230. For example, an integrated contact management system could be synchronized with an integrated accounting system, so that both systems have identical records of contact names, phone numbers, and more.

The API of the client-side integration proxy 305 further allows integrated software applications 210a,b,c . . . n to register methods that will be invoked when new calls or telephonic communications are initiated, when new events occur during a phone call involving the end user, or when new data is obtained, modified, or updated either from the hosted, VoIP PBX 320, from other integrated software applications 210a,b,c . . . n, or from direct input by the end user 150, as described hereinafter. Any one or more of the integrated software applications 210a,b,c . . . n can register a callback method through the API of the client-side integration proxy 305, and that method will be invoked by the client-side integration proxy 305 and passed relevant data upon new calls, events, or other data changes made to a call record stored in the memory cache 335. This event-driven callback method allows the client-side integration proxy 305 to push events and data to integrated software applications 210a,b,c . . . n, which is more efficient than having one or more of the software applications 210a,b,c . . . n periodically poll and pull data from the client-side integration proxy 305.

The API of the client-side integration proxy 305 can be connected to or integrated with any type of personal or business software applications 210a,b,c . . . n through direct, client-side integration that is able to support a complete and wide range of the software applications that the end user 150 can access and use on their personal computing device 170. The API of the client-side integration proxy 305 can support integration with any software application that is running on the end user's personal computing device 170 or that is otherwise accessible remotely through the end user's personal computing device 170. The API of the client-side integration proxy 305 may provide multiple client-side libraries and interfaces to allow for this flexibility. For example, it might have a JavaScript version for easy integration with web-based and browser-based software applications, and a .NET version for easy integration with Microsoft Windows native applications.

As is conventional, each of the personal or business software applications 210a,b,c . . . n can be launched and/or accessed by the end user 150 on his personal computing device 170. Data in each such software application 210a,b,c . . . n can be viewed, updated, modified, or changed by the end user 150 using the display and graphical user interface of the personal computing device 170. Such updated, additional, or modified data is then saved back into the relevant memory, data store, or database(s) 230 associated with each respective software application 210a,b,c . . . n. As stated above, the API of the client-side integration proxy 305 allows integrated software applications 210a,b,c . . . n to register methods that will be invoked when new, updated, or modified data has been received and is relevant to a call involving the end user 150 or involving the third party 180 identified in one or more records in the memory cache 335.

Figure 4:
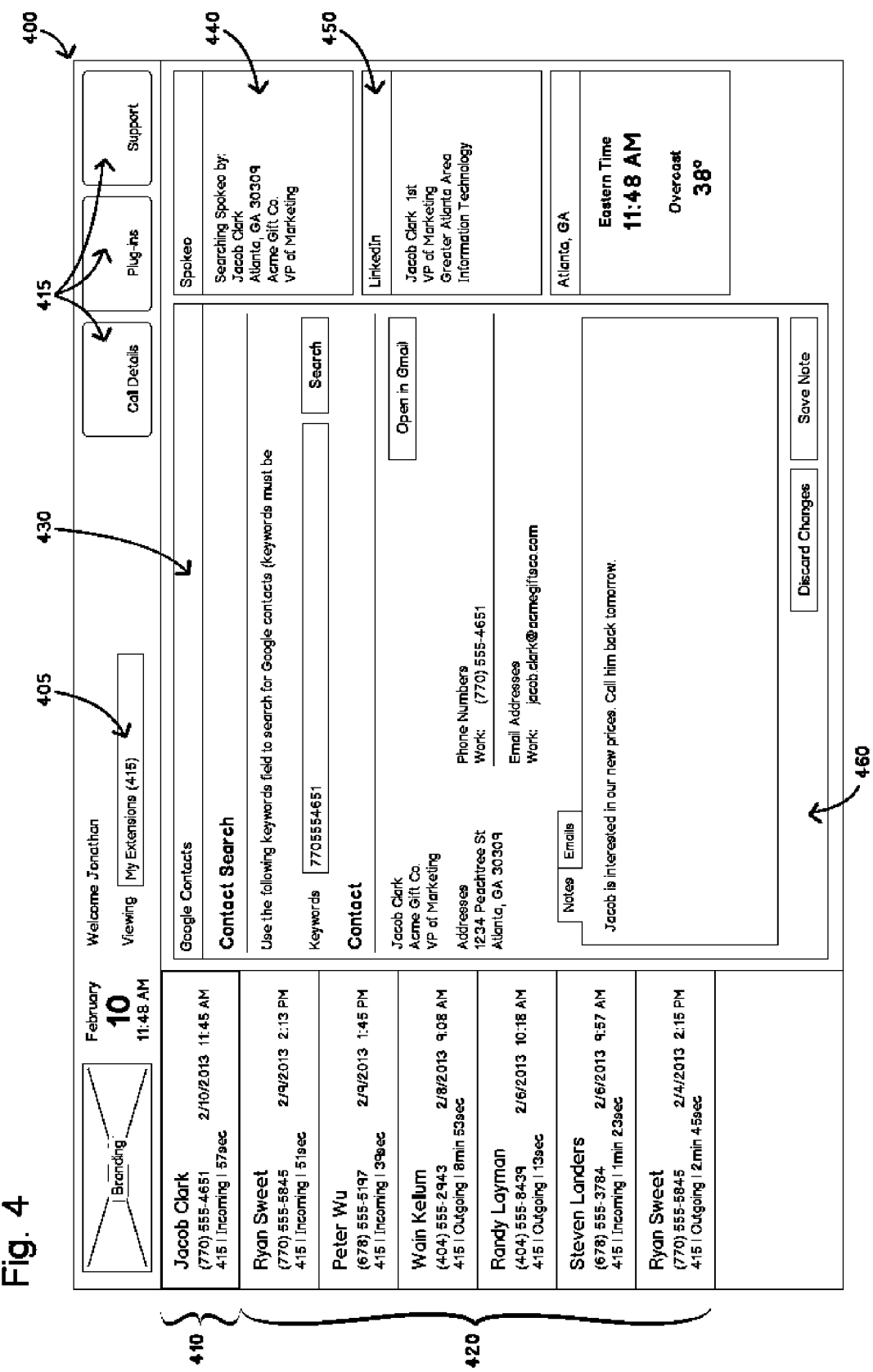
FIG. 4 illustrates an exemplary proxy user interface usable with the system of FIG. 3.

In one embodiment, the client-side integration proxy 305 generates or provides its own user interface ("proxy user interface") that can be launched and/or accessed by the end user 150 on his personal computing device 170. An exemplary proxy user interface 400 is shown in FIG. 4. Such proxy user interface 400 is preferably configured to display or present information and data provided by one or more of the plurality of integrated software applications 210a,b,c . . . n in any suitable manner, such as in different segments or panels 410, 420, 430, 440, 450, 460 of the screen, in separate windows, by activating designated tabs or buttons 415 to open separate windows, or through the use of pull down menus 405, to mention a few non-limiting examples. Thus, the proxy user interface 400 shown in FIG. 4 is merely illustrative—it being understood by those skilled in the art that such user interface can be arranged or configured in an almost infinite number of ways, manners, or layouts. Preferably, such proxy user interface 400 allows an authenticated end user 150 to navigate among active phone calls 410 and even through previously completed phone calls 420, to view data and information obtained from and currently stored in the memory cache 335 for each respective phone call (shown in panel 430), including the ability to view data (shown in panels 440 and 450) provided or gathered by the integrated software applications 210a,b,c . . . n that are connected to the API of the client-side integration proxy 305.

Preferably, the proxy user interface 400 also allows the end user 150 to navigate, view, and dynamically enter, update, add, modify, or change any relevant data in the memory cache 335 and associated with an in-process or completed call associated with the end user 150. For example, the end user 150 might enter and save notes (shown in exemplary panel 460) about a phone call during a phone conversation or after the call is complete. These notes can be stored in the memory cache 335, and can be retrieved by any of the integrated software applications 210a,b,c . . . n that pull data from the memory cache 335 via the API of the client-side integration proxy 305, or the notes can be sent to one or more of the integrated software applications 210a,b,c . . . n that have registered methods for callback through the API of the client-side integration proxy 305. Several exemplary Javascript methods and event handlers 500 for interfacing through the API of the client-side integration proxy are shown in FIG. 5. Receiving the notes entered by the end user 150 and retrieved or transmitted through the memory cache 335, the integrated software applications 210a,b,c . . . n can each store such notes appropriately in their individual memory, data stores, or database(s) 230. For example, an integrated customer relationship management (CRM) software application might store the notes in a record associated with the contact representing the phone caller (or third party), while an integrated accounting software application might store the notes in a record associated with a customer billing account representing the phone caller (or third party).

Referring back to FIG. 4, an example of the system 300 at work begins when an outside caller (third party 180) calls the extension or phone number of the end user 150. The call is initiated through the hosted, VoIP PBX 320. In this example, upon initiation, the client-side integration proxy 305 receives information from the hosted, VoIP PBX 320 via the API of the client-side integration proxy 305 about the call, such as the phone number of the caller and the caller ID (Step A). Through the API of the client-side integration proxy 305, the plurality of integrated software applications 210a,b,c . . . n are also notified that a new call has been initiated, and they also receive the phone number and caller ID. Performing a lookup by phone number, one of the software applications might retrieve the full name of the caller, the caller's company name, and the caller's business title, and that information would then be stored in the memory cache 335 via the API of the client-side integration proxy 305 (Step B). The API of the client-side integration proxy 305 then notifies other integrated software applications 210a,b,c . . . n, or such applications could themselves call the API of the client-side integration proxy 305, to discover that new, updated, or changed data about the caller/third party 180 is now available, namely the full name, company name, and business title. Other software applications 210a,b,c . . . n, now provided with that additional data about the third party 180, are then able to refine their own searches for and retrieval of relevant data, or simply store the additional data in their own memory, data stores, or database(s) 230. (Step C) The end user 150 would be able to see all the information relevant to the call, gathered and shared in the memory cache 335 and coming from the hosted, VoIP PBX 320 and multiple integrated software applications 210a,b,c . . . n, through the proxy user interface 305. The end user 150 might also enter additional information about the call, such as notes or further details about the third party 180, such as the third party's email address, which would be input and saved through the proxy user interface into the memory cache 335 (Step D), and then further shared with the integrated software applications 210a,b,c . . . n through the API of the client-side integration proxy 305 so that those integrated software applications 210a,b,c . . . n are able to take appropriate actions and update their own memory, data stores, or database(s) 230 (Step C). Preferably, all of this activity, integration, and synchronization can be repeated for each and every phone call made or received by the current, authenticated end user 150 on their current phone system extension while the client-side integration proxy 305 is running and operational.

In yet another embodiment, the functions of the client-side integration proxy 305 of the system 300 may be used by the end user 150 independently of the hosted, VoIP PBX 320. In particular, the integration and data synchronization between and among one or more of the plurality of software applications 210a,b,c . . . n available to the end user 150 using the client-side integration proxy 305 may be applied to data supplied or caused to be supplied to the client-side integration proxy 305 by the end user 150 independent of any new event (e.g., in-coming call, out-going call, conference call, termination of call, etc.) associated with the end user 150. In this manner, the end user 150 may directly submit data related to a third party 180 that is not specifically related to a communication event to the client-side integration proxy 305 for the purpose of generating and building a data file about that third party 180.

The end user 150 may interact directly with either one or more of the plurality of software applications 210a,b,c . . . n or the proxy user interface 400 using the computer or computing device 170 to submit one or more items of data related to a third party 180 to the client-side integration proxy 305.

Preferably, the data submitted by the end user 150 includes a phone number associated with the third party 180. However, it is to be understood that the end user 150 may submit any item of data associated with a third party 180, such as, for example, a name, email address, website, IP address, company name, etc., which the system 300 can use to generate additional information or data about the third party 180. Preferably, the proxy user interface 400 is configured to enable the end user 150 to directly submit data related to a third party 180 to the client-side integration proxy 305 for the purpose of generating and building a data file about that third party 180. However, it should be understood that any of the plurality of software applications 210a,b,c . . . n integrated with the client-side integration proxy 305 may be adapted or configured to achieve the same or similar function.

The data associated with a third party 150 submitted by the end user 150 may be gathered from any source available to the end user 150. For example, phone numbers may be gathered from various call logs, such as logs of missed calls, received calls, or dialed calls associated with any or all of the end users 150 of the system 300. Such call logs may be available to the end user 150 electronically through one or more of the plurality of software applications 210a,b,c . . . n and/or through the proxy user interface 400. Such call logs may also be dynamic and interactive allowing the end user 150 to select a phone number to be submitted using any available input device of the computer or computing device 170, for example by clicking on a phone number electronically presented in a call log using a mouse. The data may also be gathered from other sources, such as, for example, websites, printed materials, or personal contacts, and manually entered through one or more of the plurality of software applications 210a,b,c . . . n and/or through the proxy user interface 400 using any available input device of the computer or computing device 170.

Upon receipt of the data, the client-side integration proxy 305 assigns or dedicates a portion (e.g., record, file, etc.) of the memory cache 335 for storing data and information associated with the data submitted by the end user 150. One or more of the plurality of software applications 210a,b,c . . . n then search any available memory, data stores, or database(s) 230 for any additional information or data that may be obtainable about the third party 180 based on the end user submitted data. In some cases, one or more of the plurality of software applications 210a,b,c . . . n can generate or search for additional information or data about the third party 180 based on the end user submitted data. Any data retrieved from the available memory, data stores, or database(s) 230 or generated/obtained by the one or more of the plurality of software applications 210a,b,c . . . n about the third party 180 is then used to update, modify, add to, or otherwise enrich the data stored in the memory cache 335 associated with the end user data submission.

Software applications 210a,b,c . . . n integrated with the client-side integration proxy 305 are adapted or configured to access and retrieve data or information associated with the relevant portion, file, or record of the memory cache 335 assigned to the end user data submission. Further, such software applications 210a,b,c . . . n integrated with the client-side integration proxy 305 are adapted or configured to update, add to, or modify data or information associated with the end user data submission in the relevant portion, file, or record of the memory cache 335 assigned to the respective end user data submission based on data and information previously retrieved or retrievable from the relevant portion, file, or record of the memory cache 335 assigned to the respective end user data submission.

The software applications 210a,b,c . . . n integrated with the client-side integration proxy 305 communicate with the API of the client-side integration proxy 305, which provides access to the relevant portion, file, or record of the memory cache 335 assigned to each respective end user data submission, which allows the integrated software applications 210a,b,c . . . n to access or read data from the memory cache 335 for every end user data submission and to update, modify, add to, or otherwise enrich the data stored in the memory cache 335 and associated with each respective end user data submission. Integrated software applications 210a,b,c . . . n can also update, modify, add to, or otherwise enrich the data stored in the memory cache 335 for any end user data submission, and any data added or modified in the memory cache 335 is then available to and usable by any of the other integrated software applications 210a,b,c . . . n through the API of the client-side integration proxy 305.

The API of the client-side integration proxy 305 allows integrated software applications 210a,b,c . . . n to receive new information via either pull or push mechanisms. To pull data or poll for data changes, any of the plurality of integrated software applications 210a,b,c . . . n can read data about a respective data submission by the end user 150 through the API of the client-side integration proxy 305. To receive push notification of new data or events, any of the plurality of integrated software applications 210a,b,c . . . n can register methods through the API of the client-side integration proxy 305, and those methods will be invoked when new data is made available by the end user 150 or one the plurality of integrated software applications 210a,b,c . . . n, or when any new events occur, and the relevant information will be passed by the API of the client-side integration proxy 305 to those methods.

An example of the system 300 employing this alternative embodiment at work begins when the end user 150 submits one or more items of data related to a third party 180 to the client-side integration proxy 305. For example, the end user 150 may enter data from a business card, or click or enter a phone number from a call log through the proxy user interface 400 using any available input device of the computer or computing device 170. In this example, upon submission, the client-side integration proxy 305 receives the data submitted by the end user 150 and assigns a portion of the memory cache 335 for storing data and information associated with the data submitted by the end user 150 (Step A). The data submitted by the end user 150 preferably includes a phone number associated with the third party 180. Through the API of the client-side integration proxy 305, the plurality of integrated software applications 210a,b,c . . . n are also notified that new data has been submitted by the end user 150, and they also preferably receive the data, such as a phone number, submitted by the end user 150. Performing a lookup by phone number, one of the software applications might retrieve the full name of the caller, the caller's company name, and the caller's business title, and that information would then be stored in the memory cache 335 via the API of the client-side integration proxy 305 (Step B). The API of the client-side integration proxy 305 then notifies other integrated software applications 210a,b,c . . . n, or such applications could themselves call the API of the client-side integration proxy 305, to discover that new, updated, or changed data about the third party 180 is now available, namely the full name, company name, and business title. Other software applications 210a,b,c . . . n, now provided with that additional data about the third party 180, are then able to refine their own searches for and retrieval of relevant data, or simply store the additional data in their own memory, data stores, or database(s) 230. (Step C) The end user 150 would be able to see all the information relevant to the third party 180, gathered and shared in the memory cache 335 and coming from the multiple integrated software applications 210a,b,c . . . n, through the proxy user interface 400. The end user 150 might also enter additional information about the third party 180, such as notes or further details about the third party 180, such as the third party's email address, which would be input and saved through the proxy user interface 400 into the memory cache 335 (Step D), and then further shared with the integrated software applications 210a,b,c . . . n through the API of the client-side integration proxy 305 so that those integrated software applications 210a,b,c . . . n are able to take appropriate actions and update their own memory, data stores, or database(s) 230 (Step C). Preferably, all of this activity, integration, and synchronization can be repeated for each item of data related to a third party 180 submitted by the end user 150 while the client-side integration proxy 305 is running and operational.

This alternate embodiment is also fully compatible and complementary to the overall system wherein the client-side integration proxy 305 communicates electronically and directly with a hosted, VoIP PBX 320, through the API of the hosted, VoIP PBX 320, when there is a new event (e.g., in-coming call, out-going call, etc.) and assigns and maintains a portion of memory cache 335 to store relevant data and information for each phone call incoming to or outgoing from the end user 150 based on calls involving the end user 150 and being managed or handled by the hosted, VoIP PBX 320. Preferably, the client-side integration proxy 305 manages the memory cache 335 appropriately regardless of whether the data is received from the hosted, VoIP PBX 320 or the end user 150. In this manner, data received from the hosted, VoIP PBX 320 during a new communication event with a third party 180 could be used to supplement an existing assigned portion of the memory cache 335 that was previously and independently generated based on an end user data submission about that third party 180. The new data could then be accessed and used by the integrated software applications 210a,b,c . . . n to further update, modify, add to, or otherwise enrich the existing data in the memory cache 335 related to the third party 180.

Figure 6:
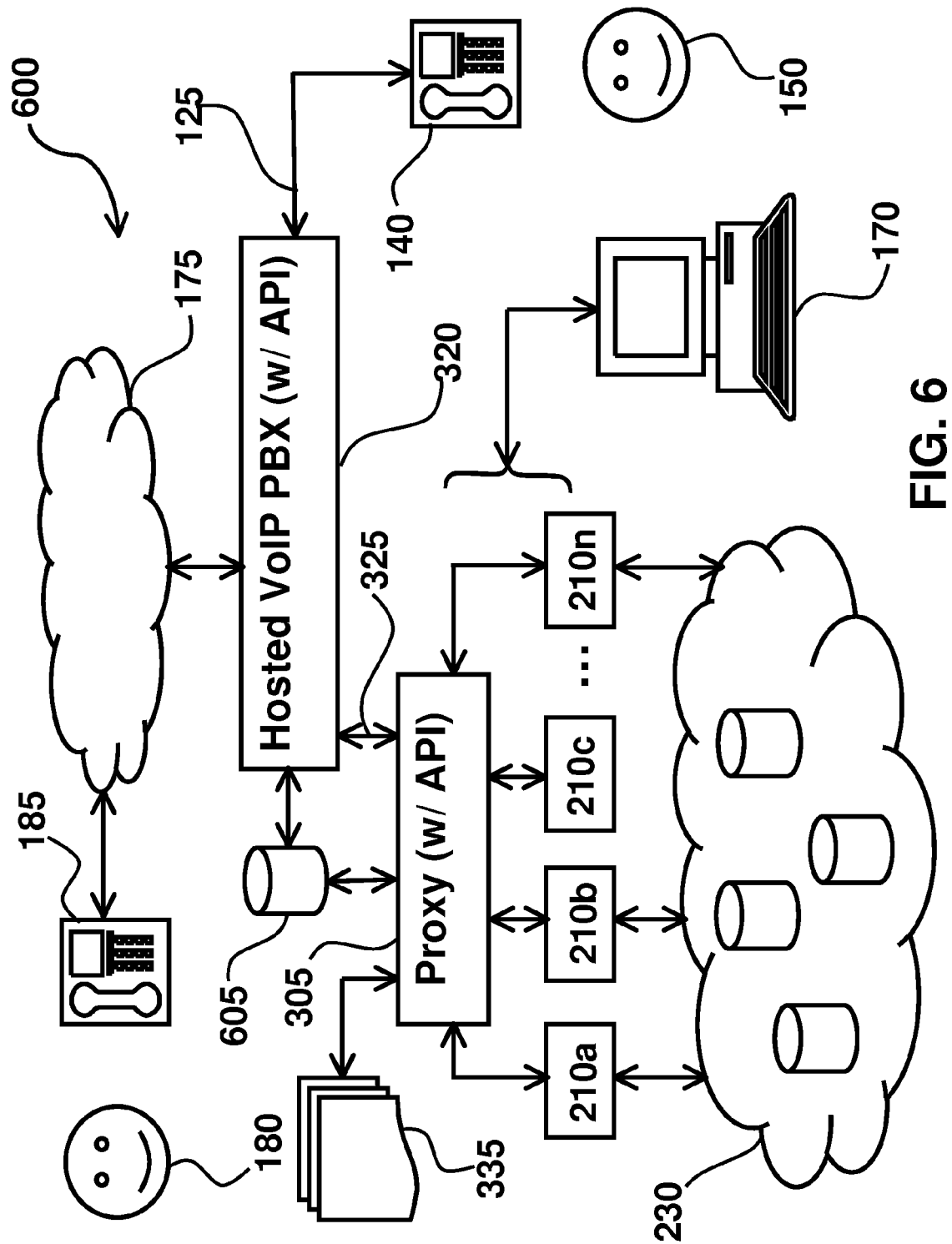
FIG. 6 illustrates another embodiment of the present technology in which there is synchronized integration between a plurality of software applications and a PBX system using a client-side integration proxy.

FIG. 6, illustrates an alternate embodiment of the system 600, described hereinafter, in which there is integration and data synchronization between and among one or more of a plurality of software applications 210a,b,c . . . n available to the end user 150 using a client-side integration proxy 305. Similar to what is shown in FIG. 3, the end user 150 has a client device 140, such as a conventional land-line phone, VoIP phone, IP phone, SIP phone, and the like, which is in electronic communication with the hosted, VoIP PBX 320 for making and receiving phone calls or telephonic communications. The hosted, VoIP PBX 320 handles and manages the end user's side of any phone call 125 to or from the end user 150. The third party 180 receives or places a phone call with the end user 150 using any conventional calling device 185, such as a land line phone, mobile or cellular phone, VoIP phone, IP phone, SIP phone, and the like. The third party's calling device 185 communicates with the hosted, VoIP PBX 320 through a telephonic network 175, such as a PSTN, cellular network, the Internet, and the like. The end user 150 also has a conventional computer or computing device 170 with a display or other graphical user interface.

The client-side integration proxy 305 has its own API and communicates electronically and directly through its API with the one or more plurality of software applications 210a, b,c . . . n. The client-side integration proxy 305 also includes or has access to a memory cache 335 and a data store 605. The data store 605 may be incorporated into or associated with the hosted, VoIP PBX 320 or the client-side integration proxy 305. Alternately, the data store 605 may be independent of the hosted, VoIP PBX 320 and the client-side integration proxy 305 and be electronically accessible in any suitable manner.

Typically, the plurality of software applications 210a,b,c . . . n are running on or otherwise accessible to the computer or computing device 170 and are able to generate or display information to the end user 150 directly on the display or user interface of the computing device 170. The plurality of software applications 210a,b,c . . . n preferably have access to memory, data stores, or one or more databases 230 of information and/or are capable of generating or otherwise obtaining data relevant to the end user 150, the third party 180, and any calls between the end user 150 and third party 180. Preferably, the client-side integration proxy 305 generates or provides its own proxy user interface 400 that can be launched and/or accessed by the end user 150 on his personal computing device 170. The proxy user interface 400 is preferably configured to display or present information and data provided by one or more of the plurality of integrated software applications 210a,b,c . . . n to the end user 150 in a coherent manner and to permit the end user 150 to submit requests and data to the client-side integration proxy 305.

The client-side integration proxy 305 communicates electronically and directly with a hosted, VoIP PBX 320, through the API of the hosted, VoIP PBX 320, when there is a new event (e.g., in-coming call, out-going call, etc.). Preferably, the client-side integration proxy 305 detects the new event associated with the end user 150 based on data obtained from the hosted, VoIP PBX 320 through the API of the hosted, VoIP PBX 320 for each new event handled and managed by the hosted, VoIP PBX. The client-side integration proxy 305 then assigns a portion of the data store 605 as a record for storing information about the new event. The client-side integration proxy 305 preferably assigns a record in the data store 605 for each new event handled and managed by the hosted, VoIP PBX. It should be understood that the client-integration proxy 305 may alternately act as a conduit for permitting one of the plurality of software applications 210a,b,c . . . n to perform the operation of creating records of new events in the data store 605. Alternately, the hosted, VoIP PBX 320 may assign a portion of the data store 605 as a record for storing information about each the new event handled and managed by the hosted, VoIP PBX 320.

In practice, the hosted, VoIP PBX 320 communicates electronically with the client-side integration proxy 305 through the API of the hosted, VoIP PBX 320, whenever there is a new event (e.g., in-coming call, out-going call, conference call, termination of call, etc.) associated with the end user 150. For example, when there is a call or telephonic communication coming in from the third party 180 and intended for the end user 150, the hosted, VoIP PBX 320 provides the client-side integration proxy 305 with the phone number (or extension) of the end user 150 being called (to identify the relevant end user associated with the phone call), as well as the phone number and caller ID of the third party 180 initiating the call. Preferably, the client-side integration proxy 305 integrates directly with the hosted, VoIP PBX 320 through the API of the hosted, VoIP PBX and all data associated with each new event is stored as a record in the data store 605.

The data associated with the new events stored in the data store 605 may be utilized to assemble event logs accessible by the end user 150. For example, the data in the data store 605 may be used to compile various call logs, such as logs of missed calls, received calls, or dialed calls associated with any or all of the end users 150 of the system 600. The call logs may be assembled and made available to the end user 150 electronically through one or more of the plurality of software applications 210a,b,c . . . n and/or through the proxy user interface 400. Preferably, the call logs are dynamic and interactive allowing the end user 150 to select a particular event using any available input device of the computer or computing device 170. For example, the end user 150 may click on a phone number electronically presented to the end user 150 in a missed call log on the proxy user interface 400 using a mouse.

In this manner, the end user 150 may select any previous event from an event log to retrieve data associated with that event. Preferably, the end user 150 submits a request for data associated with an event to the client-side integration proxy 305 by selecting an event from an event log presented to the end user 150 on the proxy user interface 400. The client-side integration proxy receives the request from the end user 150 and retrieves information from the record associated with the selected event stored in the data store 605. The client-side integration proxy 305 then assigns and maintains a portion of memory cache 335 to store the data and information retrieved from the record associated with the event in the data store 605.

Software applications 210a,b,c . . . n integrated with the client-side integration proxy 305 are adapted or configured to access and retrieve data or information from the memory cache 335 assigned to that event by the client-side integration proxy 305. Further, such software applications 210a,b,c . . . n integrated with the client-side integration proxy 305 are adapted or configured to update, add to, or modify the data or information associated with the event in the relevant portion of the memory cache 335 based on data and information previously retrieved or retrievable from the relevant portion of the memory cache 335 assigned to the event.

The software applications 210a,b,c . . . n integrated with the client-side integration proxy 305 communicate with the API of the client-side integration proxy 305, which provides access to the relevant portion of the memory cache 335 assigned to the event selected by the end user 150, which allows the integrated software applications 210a,b,c . . . n to access or read data from the memory cache 335 and to update, modify, add to, or otherwise enrich the data stored in the memory cache 335. Integrated software applications 210a,b,c . . . n can also update, modify, add to, or otherwise enrich the data stored in the memory cache 335 for any event, and any data added to or modified in the memory cache 335 is then available to and usable by any of the other integrated software applications 210a,b,c . . . n through the API of the client-side integration proxy 305. Additionally, the end user 150 may update, modify, or add to the data stored in the memory cache 335 for any event. The end user 150 may submit data using the proxy user interface 400 and/or any of the integrated software applications 210a,b,c . . . n available to the end user 150.

The API of the client-side integration proxy 305 allows integrated software applications 210a,b,c . . . n to receive new information via either pull or push mechanisms. To pull data or poll for data changes, any of the plurality of integrated software applications 210a,b,c . . . n can read data about a respective event through the API of the client-side integration proxy 305. To receive push notification of new data or events, any of the plurality of integrated software applications 210a, b,c . . . n can register methods through the API of the client-side integration proxy 305, and those methods will be invoked when new data is available or when any new events occur, and the relevant information will be passed by the API of the client-side integration proxy 305 to those methods.

Referring back to FIG. 6, an example of the system 600 at work begins when a third party 180 unsuccessfully calls the extension or phone number of the end user 150. The call is initiated through the hosted, VoIP PBX 320. In this example, upon initiation, the client-side integration proxy 305 receives information from the hosted, VoIP PBX 320 via the API of the client-side integration proxy 305 about the call, such as the phone number of the caller and the caller ID and stores that information in a record in the data store 605. The unsuccessful call is presented to the end user 150 on a missed call log through the proxy user interface 400. The end user 150 selects the missed call on proxy user interface 400 and a request is submitted to the client-side integration proxy 305. The client-side integration proxy 305 retrieves information from the record associated with the missed call from the data store 605, and assigns a portion of the memory cache 335 to store the information retrieved from the data store 605 associated with the missed call.

Through the API of the client-side integration proxy 305, the plurality of integrated software applications 210*a,b,c* . . . *n* are notified that a request for information has been initiated, and they also receive the phone number and caller ID. Performing a lookup by phone number, one of the software applications might retrieve the full name of the caller, the caller's company name, and the caller's business title, and that information would then be stored in the memory cache 335 via the API of the client-side integration proxy 305. The API of the client-side integration proxy 305 then notifies other integrated software applications 210*a,b,c* . . . *n*, or such applications could themselves call the API of the client-side integration proxy 305, to discover that new, updated, or changed data about the third party 180 is now available, namely the full name, company name, and business title. Other software applications 210*a,b,c* . . . *n*, now provided with that additional data about the third party 180, are then able to refine their own searches for and retrieval of relevant data, or simply store the additional data in their own memory, data stores, or database(s) 230.

The end user 150 would be presented with all the information relevant to the missed call, gathered and shared in the memory cache 335 and coming from the hosted, VoIP PBX 320 and multiple integrated software applications 210*a,b,c* . . . *n*, through the proxy user interface 305. The end user 150 might also enter additional information about the missed call, such as notes or further details about the third party 180, such as the third party's email address, which would be input and saved through the proxy user interface into the memory cache 335, and then further shared with the integrated software applications 210*a,b,c* . . . *n* through the API of the client-side integration proxy 305 so that those integrated software applications 210*a,b,c* . . . *n* are able to take appropriate actions and update their own memory, data stores, or database(s) 230. Preferably, all of this activity, integration, and synchronization can be repeated for each and every event selected by the end user 150 from any generated event logs while the client-side integration proxy 305 is running and operational.

In view of the foregoing detailed description of preferred embodiments of the present invention, it readily will be understood by those persons skilled in the art that the present invention is susceptible to broad utility and application. While various aspects have been described in the context of screen shots, additional aspects, features, and methodologies of the present invention will be readily discernable therefrom.

Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

We claim:

1. A system for collecting information associated with a telephonic communication made through a voice over Internet Protocol (VoIP) system by dynamically integrating a plurality of end user software applications comprising:
   a VoIP-enabled client device associated with an end user;
   a hosted VoIP private branch exchange (PBX) in electronic communication with the VoIP-enabled client device for handling and managing the end user's side of a telephonic communication;
   a client side integration proxy in electronic communication with the hosted VoIP PBX through an application programming interface (API) of the hosted VoIP PBX, the client side integration proxy comprising:
      its own API for communicating and exchanging data with the plurality of end user software applications; and
      a memory cache accessible by the plurality of end user software applications through the API of the client side integration proxy;
   a data store containing data obtained from the hosted VoIP PBX for each telephonic communication handled and managed by the hosted VoIP PBX, the data store being in electronic communication with the client side integration proxy; and
   software executing on the client side integration proxy for:
      (a) receiving a request from the end user to retrieve information about a previous telephonic communication,
      (b) retrieving data related to the previous telephonic communication from the data store;
      (c) assigning a portion of the memory cache for storing the retrieved data about the previous telephonic communication,
      (d) enabling one or more of the plurality of end user software applications to access the data about the previous telephonic communication currently stored in the assigned portion of the memory cache, (e) enabling one or more of the plurality of end user software applications, in response to the data about the previous telephonic communication accessed from the assigned portion of the memory cache, to update, modify, or add to the data about the previous telephonic communication currently stored in the assigned portion of the memory cache based on data relevant to the previous telephonic communication obtainable or generated by the one or more of the plurality of end user software applications, and (f) retrieving and presenting the supplemented data about the previous telephonic communication to the end user.

2. The system of claim 1, wherein, if the data related to the previous telephonic communication stored in the assigned portion of the memory cache is updated, modified, or added to, the client side integration proxy notifies one or more of the plurality of end user software applications about the modified information and requests the one or more of the plurality of end user software applications further to update, modify, or add to the information about the previous telephonic communication stored in the assigned portion of the memory cache in response to the modified information.

3. The system of claim 1, wherein the client side integration proxy enables one or more of the plurality of end user software applications to access the data related to the previous telephonic communication stored in the assigned portion of the memory cache (i) by pushing at least a portion of the stored information to one or more of the plurality of end user software applications or (ii) by polling and pulling at least a portion of the stored information from the assigned portion of the memory cache.

4. The system of claim 1, wherein one or more of the plurality of end user software applications further updates, modifies, or adds to the data related to the previous telephonic communication stored in the assigned portion of the memory cache after the data related to the previous telephonic communication stored in the assigned portion of the memory cache has been previously modified by another respective one or more of the plurality of end user software applications or by the end user.

5. The system of claim 1, wherein the supplemented information about the previous telephonic communication comprises one or more of the following provided by one or more of the plurality of end user software applications: a physical address of the third party, an email address of the third party, a name of the company with which the third party works, a job title of the third party, a communication history between the end user and the third party, a communication history between the company with which the end user works and the third party, a communication history between the company with which the third party works and the end user, notes regarding the third party, links to databases having additional information about the third party or about the company with which the third party works, biographical information about the third party, current geographical location of the third party or of the company with which the third party works, a graphical representation or image of the third party, documents available to the end user and related to the third party or related to the company with which the third party works, and emails available to the end user and related to the third party or related to the company with which the third party works.

6. The system of claim 1, wherein the data obtained from the hosted VoIP PBX includes one or more of the following: a phone number of the third party, a name of the third party, an IP address of the device being used by the third party for the telephonic communication, a phone number or extension of the end user, a name of the end user, an IP address of the client device of the end user, an indication whether a portion or all of the telephonic communication is encrypted, an indication whether a portion or all of the telephonic communication is using a secured communication line, an indication whether the telephonic communication is inbound to or outbound from the hosted VoIP PBX, an indication whether the telephonic communication is being monitored, an indication whether the telephonic communication is being recorded, an indication of call ringing, an indication of call answered, and an indication of call disconnected.

7. A system for collecting information associated with a telephonic communication made through a voice over Internet Protocol (VoIP) system by dynamically integrating a plurality of end user software applications comprising:

a VoIP-enabled client device associated with an end user;

a hosted VoIP private branch exchange (PBX) in electronic communication with the VoIP-enabled client device for handling and managing the end user's side of a telephonic communication;

a client side integration proxy in electronic communication with the hosted VoIP PBX through an application programming interface (API) of the hosted VoIP PBX, the client side integration proxy comprising:

its own API for communicating and exchanging data with the plurality of end user software applications;

a memory cache accessible by the plurality of end user software applications through the API of the client side integration proxy; and a data store for storing records containing information about telephonic communications that are handled and managed by the hosted VoIP PBX; and software executing on the client side integration proxy for:

(a) detecting a telephonic communication based on data obtained from the hosted VoIP PBX through the API of the hosted VoIP PBX for each telephonic communication handled and managed by the hosted VoIP PBX;

(b) assigning a portion of the data store as a record for storing information about the telephonic communication for each telephonic communication handled and managed by the hosted VoIP PBX, wherein the information about the telephonic communication initially stored in the record includes the data obtained from the hosted VoIP PBX;

(c) receiving a request from the end user to retrieve information about a previous telephonic communication;

(d) retrieving information from the record associated with the previous telephonic communication stored in the data store;

(e) assigning a portion of the memory cache for storing the retrieved information about the previous telephonic communication;

(f) enabling the one or more of the plurality of end user software applications to access the information about the previous telephonic communication stored in the assigned portion of the memory cache;

(g) enabling one or more of the plurality of end user software applications to update, modify, or add to the information about the previous telephonic communication stored in the memory cache based on data relevant to the previous telephonic communication obtainable or generated by the one or more of the plurality of end user software applications, and (h) retrieving and presenting the supplemented information about the previous telephonic communication to the end user.

8. The system of claim 7, wherein, if the data related to the previous telephonic communication stored in the assigned portion of the memory cache is updated, modified, or added to, the client side integration proxy notifies one or more of the plurality of end user software applications about the modified information and requests the one or more of the plurality of end user software applications further to update, modify, or add to the information about the previous telephonic communication stored in the assigned portion of the memory cache in response to the modified information.

9. The system of claim 7, wherein the client side integration proxy enables one or more of the plurality of end user software applications to access the data related to the previous telephonic communication stored in the assigned portion of the memory cache (i) by pushing at least a portion of the stored information to one or more of the plurality of end user software applications or (ii) by polling and pulling at least a portion of the stored information from the assigned portion of the memory cache.

10. The system of claim 7, wherein one or more of the plurality of end user software applications further updates, modifies, or adds to the data related to the previous telephonic communication stored in the assigned portion of the memory cache after the data related to the previous telephonic communication stored in the assigned portion of the memory cache has been previously modified by another respective one or more of the plurality of end user software applications or by the end user.

11. The system of claim 7, wherein the supplemented information about the previous telephonic communication comprises one or more of the following provided by one or more of the plurality of end user software applications: a physical address of the third party, an email address of the third party, a name of the company with which the third party works, a job title of the third party, a communication history between the end user and the third party, a communication history between the company with which the end user works and the third party, a communication history between the company with which the third party works and the end user, notes regarding the third party, links to databases having additional information about the third party or about the company with which the third party works, biographical information about the third party, current geographical location of the third party or of the company with which the third party works, a graphical representation or image of the third party, documents available to the end user and related to the third party or related to the company with which the third party works, and emails available to the end user and related to the third party or related to the company with which the third party works.

12. The system of claim 7, wherein the data obtained from the hosted VoIP PBX includes one or more of the following: a phone number of the third party, a name of the third party, an IP address of the device being used by the third party for the telephonic communication, a phone number or extension of the end user, a name of the end user, an IP address of the client device of the end user, an indication whether a portion or all of the telephonic communication is encrypted, an indication whether a portion or all of the telephonic communication is using a secured communication line, an indication whether the telephonic communication is inbound to or outbound from the hosted VoIP PBX, an indication whether the telephonic communication is being monitored, an indication whether the telephonic communication is being recorded, an indication of call ringing, an indication of call answered, and an indication of call disconnected.

13. A system for collecting information associated with a telephonic communication made through a voice over Internet Protocol (VoIP) system by dynamically integrating a plurality of end user software applications comprising:
 a VoIP-enabled client device associated with an end user;
 a hosted VoIP private branch exchange (PBX) in electronic communication with the VoIP-enabled client device for handling and managing the end user's side of a telephonic communication comprising:
  an application programming interface (API); and
  a data store for storing data related to each telephonic communication handled and managed by the hosted VoIP PBX;
 a client side integration proxy in electronic communication with the hosted VoIP PBX through the API of the hosted VoIP PBX, the client side integration proxy comprising:
  its own API for communicating and exchanging data with the plurality of end user software applications; and
  a memory cache accessible by the plurality of end user software applications through the API of the client side integration proxy; and
 software executing on the client side integration proxy for:
  (a) receiving a request from the end user to retrieve information about a previous telephonic communication;
  (b) retrieving data associated with the previous telephonic communication from the data store through the API of the hosted VoIP PBX;
  (c) assigning a portion of the memory cache for storing the retrieved data about the previous telephonic communication;
  (d) enabling the one or more of the plurality of end user software applications to access the data about the previous telephonic communication stored in the assigned portion of the memory cache;
  (e) enabling one or more of the plurality of end user software applications to update, modify, or add to the data about the previous telephonic communication stored in the memory cache based on information relevant to the previous telephonic communication obtainable or generated by the one or more of the plurality of end user software applications, and
  (f) retrieving and presenting the supplemented data about the previous telephonic communication to the end user.

14. The system of claim 13, wherein, if the data related to the previous telephonic communication stored in the assigned portion of the memory cache is updated, modified, or added to, the client side integration proxy notifies one or more of the plurality of end user software applications about the modified information and requests the one or more of the plurality of end user software applications further to update, modify, or add to the information about the previous telephonic communication stored in the assigned portion of the memory cache in response to the modified information.

15. The system of claim 13, wherein the client side integration proxy enables one or more of the plurality of end user software applications to access the data related to the previous telephonic communication stored in the assigned portion of the memory cache (i) by pushing at least a portion of the stored information to one or more of the plurality of end user software applications or (ii) by polling and pulling at least a portion of the stored information from the assigned portion of the memory cache.

16. The system of claim 13, wherein one or more of the plurality of end user software applications further updates, modifies, or adds to the data related to the previous telephonic communication stored in the assigned portion of the memory cache after the data related to the previous telephonic communication stored in the assigned portion of the memory cache has been previously modified by another respective one or more of the plurality of end user software applications or by the end user.

17. The system of claim 13, wherein the supplemented information about the previous telephonic communication comprises one or more of the following provided by one or more of the plurality of end user software applications: a physical address of the third party, an email address of the third party, a name of the company with which the third party works, a job title of the third party, a communication history between the end user and the third party, a communication history between the company with which the end user works and the third party, a communication history between the company with which the third party works and the end user, notes regarding the third party, links to databases having additional information about the third party or about the company with which the third party works, biographical information about the third party, current geographical location of the third party or of the company with which the third party works, a graphical representation or image of the third party, documents available to the end user and related to the third party or related to the company with which the third party works, and emails available to the end user and related to the third party or related to the company with which the third party works.

18. The system of claim 13, wherein the data obtained from the hosted VoIP PBX includes one or more of the following: a phone number of the third party, a name of the third party, an IP address of the device being used by the third party for the telephonic communication, a phone number or extension of the end user, a name of the end user, an IP address of the client device of the end user, an indication whether a portion or all of the telephonic communication is encrypted, an indication whether a portion or all of the telephonic communication is using a secured communication line, an indication whether the telephonic communication is inbound to or outbound from the hosted VoIP PBX, an indication whether the telephonic communication is being monitored, an indication whether the telephonic communication is being recorded, an indication of call ringing, an indication of call answered, and an indication of call disconnected.

* * * * *